US011154974B2

(12) United States Patent
Wang et al.

(10) Patent No.: US 11,154,974 B2
(45) Date of Patent: Oct. 26, 2021

(54) HAND-HELD TOOL AND CLAMPING DEVICE THEREOF

(71) Applicant: Positec Power Tools (Suzhou) Co., Ltd., Suzhou (CN)

(72) Inventors: Lianbao Wang, Suzhou (CN); Hongfeng Zhong, Suzhou (CN); Jingtao Xu, Suzhou (CN); Warren Brown, Mount Evelyn (AU); Harry Szommer, Frankston North (AU); Graham Gerhardt, Warrandyte (AU)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 360 days.

(21) Appl. No.: 15/755,333

(22) PCT Filed: Aug. 31, 2016

(86) PCT No.: PCT/CN2016/097659
§ 371 (c)(1),
(2) Date: Feb. 26, 2018

(87) PCT Pub. No.: WO2017/036403
PCT Pub. Date: Mar. 9, 2017

(65) Prior Publication Data
US 2018/0243894 A1 Aug. 30, 2018

(30) Foreign Application Priority Data

Aug. 31, 2015 (CN) .......................... 201510547674.8
Mar. 3, 2016 (CN) .......................... 201610121636.0

(51) Int. Cl.
*B23D 61/00* (2006.01)
*B27B 19/00* (2006.01)
(Continued)

(52) U.S. Cl.
CPC ............ *B25F 3/00* (2013.01); *B23B 31/4073* (2013.01); *B23D 61/006* (2013.01); *B24B 23/04* (2013.01);
(Continued)

(58) Field of Classification Search
CPC ....... B27B 19/006; B27B 5/32; B24B 23/046; B24B 23/022; B24B 5/006; B23D 61/006
(Continued)

(56) References Cited

U.S. PATENT DOCUMENTS 5,157,873 A * 10/1992 Rudolf .................. B24B 23/022
  279/904
5,158,331 A * 10/1992 Wesselski ............... F16B 2/185
  294/89

(Continued)

FOREIGN PATENT DOCUMENTS

| CN | 101780668 A | 7/2010 |
| CN | 103029106 A | 4/2013 |

(Continued)

OTHER PUBLICATIONS

English Translation of International Search Report and Written Opinion of PCT/CN2016/097659 dated Nov. 20, 2016.

*Primary Examiner* — Kenneth E Peterson
(74) *Attorney, Agent, or Firm* — Middleton Reutlinger

(57) ABSTRACT

The present embodiment discloses a hand-held tool and a clamping device thereof. The clamping device of a hand-held tool includes: a mounting base; a clamping unit configured to fasten a working tool in an axial direction; and an operation assembly, including an operating member and a driving member, where the operating member is capable of performing compound motion relative to the mounting base, and the operating member is operable to drive the driving member to selectively mate with and disengage from the
(Continued)

clamping unit. In this way, the hand-held tool of the present embodiment has the clamping device. By way of compound motion, not only comfort of operation can be achieved, but also parts can be saved, thereby making the structure simpler and more reliable.

19 Claims, 18 Drawing Sheets

(51) Int. Cl.
*B25F 3/00* (2006.01)
*B24B 23/04* (2006.01)
*B23B 31/40* (2006.01)
*F16H 21/40* (2006.01)
*B24B 23/02* (2006.01)
*B27B 5/32* (2006.01)

(52) U.S. Cl.
CPC ............ *F16H 21/40* (2013.01); *B24B 23/022* (2013.01); *B27B 5/32* (2013.01); *B27B 19/006* (2013.01)

(58) Field of Classification Search
USPC .......................................................... 83/666
See application file for complete search history.

(56) References Cited

U.S. PATENT DOCUMENTS

| | | | | |
|---|---|---|---|---|
| 5,601,483 | A * | 2/1997 | Rudolf | B24B 23/022 451/342 |
| 6,109,157 | A * | 8/2000 | Talesky | B24B 23/022 83/477.2 |
| 2002/0030328 | A1* | 3/2002 | Nock | B27B 5/32 279/8 |
| 2002/0035882 | A1* | 3/2002 | Hartmann | B27B 5/32 74/107 |
| 2002/0170408 | A1* | 11/2002 | Hartmann | B24B 23/022 83/666 |
| 2007/0060030 | A1* | 3/2007 | Pollak | B24B 45/006 451/359 |
| 2009/0023371 | A1* | 1/2009 | Blickle | B24B 45/006 451/359 |
| 2010/0197208 | A1* | 8/2010 | Blickle | B24B 45/006 451/342 |
| 2010/0236806 | A1* | 9/2010 | Heilig | B24B 41/007 173/217 |
| 2011/0209888 | A1* | 9/2011 | Elsworthy | B23B 31/1071 173/217 |
| 2012/0139196 | A1* | 6/2012 | Zhou | B24B 45/006 279/140 |
| 2012/0292864 | A1* | 11/2012 | Zhou | B24B 45/006 279/141 |
| 2013/0180747 | A1* | 7/2013 | Brown | B25F 5/00 173/145 |
| 2013/0284472 | A1 | 10/2013 | Kildevaeld | |
| 2014/0070499 | A1* | 3/2014 | Fankhauser | B24B 23/04 279/141 |
| 2014/0084552 | A1* | 3/2014 | Zieger | B24B 23/022 279/141 |
| 2014/0144662 | A1* | 5/2014 | Zhou | B25F 5/00 173/213 |
| 2014/0191481 | A1* | 7/2014 | Kawakami | B27B 5/32 279/142 |
| 2014/0318286 | A1* | 10/2014 | Seebauer | B27B 19/006 74/55 |
| 2015/0042052 | A1* | 2/2015 | Furusawa | B24B 45/006 279/141 |
| 2015/0183107 | A1* | 7/2015 | Ito | B27B 19/006 279/141 |
| 2016/0271711 | A1* | 9/2016 | Qian | B24B 27/08 |
| 2017/0050292 | A1* | 2/2017 | Aoki | B24B 45/006 |
| 2017/0291277 | A1* | 10/2017 | Gao | B24B 45/006 |
| 2018/0085885 | A1* | 3/2018 | Christophersen | B24B 45/00 |
| 2018/0319001 | A1* | 11/2018 | Zhong | B24B 41/007 |
| 2019/0120347 | A1* | 4/2019 | Bek | B25F 3/00 |
| 2019/0202027 | A1* | 7/2019 | Fellmann | B24B 45/006 |

FOREIGN PATENT DOCUMENTS

| | | |
|---|---|---|
| CN | 103659741 A | 3/2014 |
| GN | 102896619 A | 1/2013 |
| WO | 2013065615 A1 | 5/2013 |
| WO | 2017036403 A1 | 3/2017 |

* cited by examiner

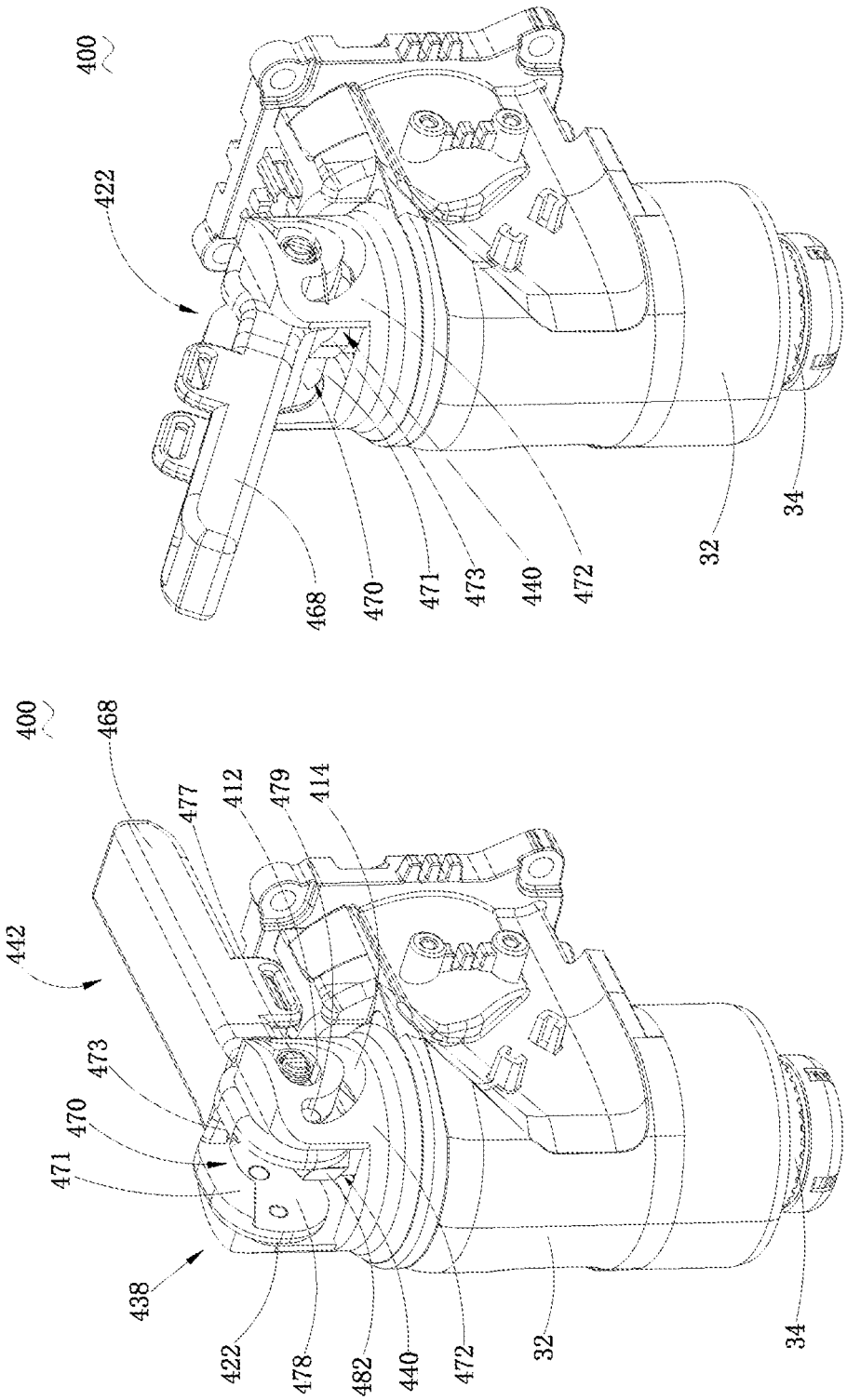

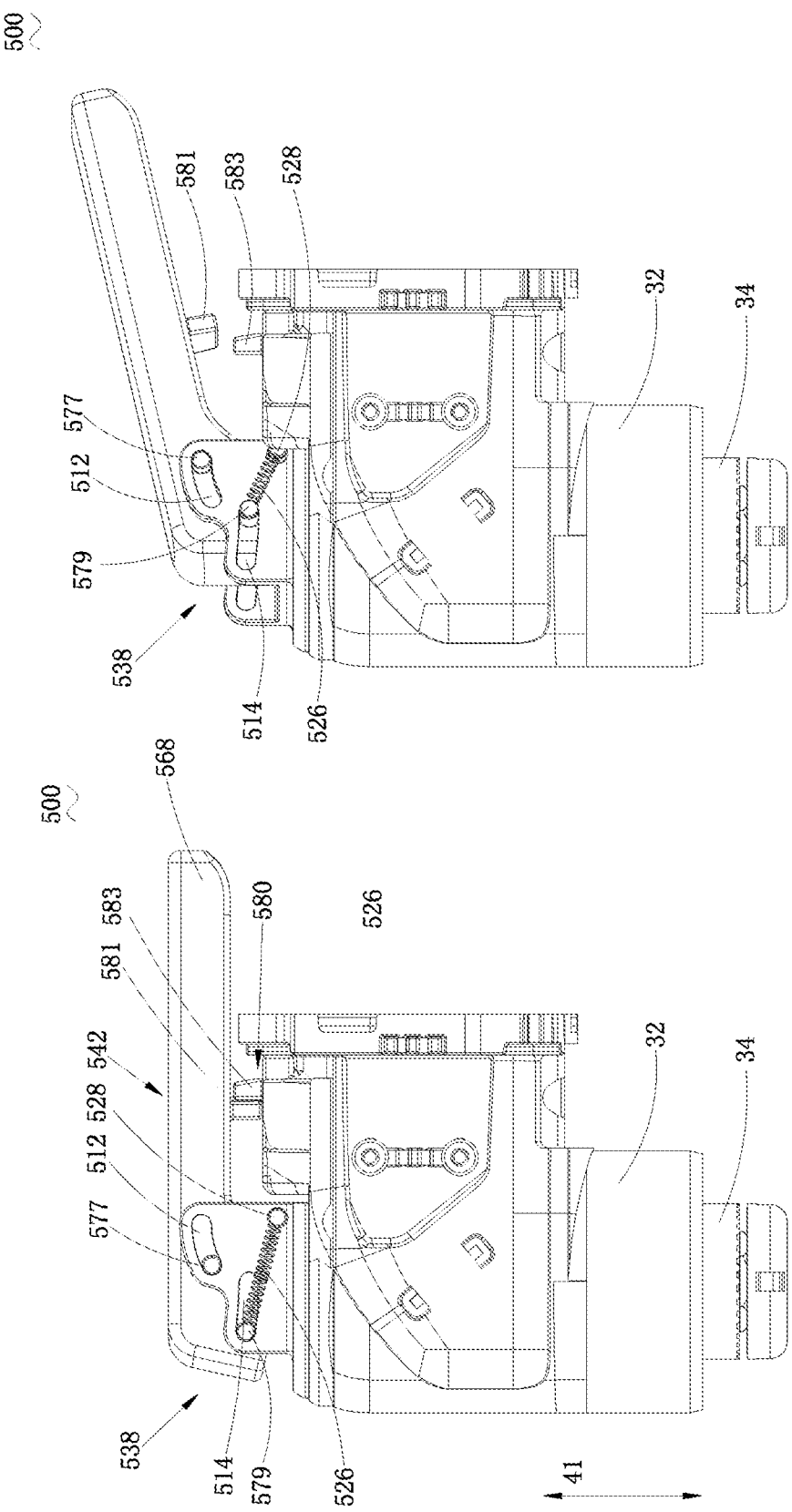

HAND-HELD TOOL AND CLAMPING DEVICE THEREOF

BACKGROUND

Technical Field

The present embodiment relates to a hand-held tool and a clamping device thereof.

Related Art

An oscillating power tool is a common hand-held tool in the field. The operating principle of the oscillating power tool is that an output shaft performs oscillating motion around a shaft axis of the output shaft. Therefore, after a user mounts different working tools on the tool, for example, a straight saw blade, a circular saw blade, a triangular frosted plate or a shovel-shaped scraper on a free end of the output shaft, of various different operation functions, for example, sawing, cutting, grinding and scraping, may be implemented, to adapt to different operating requirements.

An oscillating power tool disclosed in Chinese publication patent application No. CN101780668A includes a motor. A spindle of the motor is connected to an eccentric pin, and a bearing is sleeved on the eccentric pin, thereby constituting an eccentric wheel structure. When the spindle rotates, the eccentric wheel structure may perform eccentric rotary motion around a shaft axis of the spindle. An output shaft of the oscillating power tool is disposed perpendicular to the spindle. A fork assembly is fixedly to the output shaft. Two opposite extension arms are formed on the fork assembly and surround the eccentric wheel structure. Inner sides of the two extension arms are both in close contact with the bearing in the eccentric wheel structure, so that when an eccentric wheel performs eccentric rotation, the eccentric wheel structure drives a fork to produce oscillating motion in a horizontal direction, and enables, by using a fixed connection between the fork and the output shaft, the output shaft to oscillate around a shaft axis of the output shaft. When different working tools are being mounted on a free end of the output shaft, the oscillating power tool may implement various operation functions under high-speed oscillating motion.

However, in a current oscillating power tool, a relatively original manner of mounting a working tool is still used. That is, a fastening bolt is unscrewed by using a spanner, and then a fastening member is removed from an output shaft. Similarly, the same manner also applies to mounting and replacement of accessories. The working tool can be replaced and screwed for mounting only after the fastening bolt is unscrewed by using the spanner. The operation is quite complex and is time-consuming and laborious.

In view of the above, persons skilled in the art also make lots of improvements. A working tool is mounted and replaced by using a quick clamping device without a spanner. However, there are still lots of problems. For example, the operation is not comfortable enough, the structure is complex, and reliability is poor. Therefore, it is really necessary to provide an improved hand-held tool, to resolve the foregoing problems.

SUMMARY

A technical problem to be resolved by the present embodiment is to provide a clamping device and a hand-held tool having the same, so as to achieve comfort of operation and also save parts, thereby making the structure simpler and more reliable.

To resolve the foregoing technical problems, a technical solution used in the present embodiment is: a clamping device of a hand-held tool, wherein the clamping device comprises: a mounting base; a clamping unit being configured to fasten a working tool in an axial direction; and an operation assembly, comprising an operating member and a driving member, wherein the operating member is capable of performing a compound motion relative to the mounting base, and the operating member is operable to drive the driving member to selectively mate with and disengage from the clamping unit.

Preferably, the compound motion comprises a rotational motion around a movable rotating axis.

Preferably, the movable rotating axis is linearly movable in a plane perpendicular thereto.

Preferably, a linear trace of the movable rotating axis comprises a straight line, a curved line, a polyline, an arc line, or a combination of at least two of a straight line, a curved line, a polyline, and an arc line.

Preferably, one of the operating member and the mounting base is provided with a guiding member, the other one of the operating member and the mounting base is provided with a guiding groove, and the guiding member is rotatable and sliding in the guiding groove.

Preferably, the guiding groove comprises a first groove and a second groove that communicate with each other, and an angle formed between the first groove and the second groove is an obtuse angle.

Preferably, at least one of the first groove and the second groove is obliquely disposed relative to the axial direction.

Preferably, the guiding groove comprises a straight-line groove, and the straight-line groove is disposed along the axial direction or obliquely disposed relative to the axial direction.

Preferably, the guiding groove comprises a first guiding groove and a second guiding groove that are separately disposed, and the guiding member comprises a first guiding member received in the first guiding groove and a second guiding member received in the second guiding groove.

Preferably, wherein at least one of the first guiding groove and the second guiding groove is an arcuate groove.

Preferably, the guiding member is disposed on the operating member, and the guiding member is fixedly connected to the driving member.

Preferably, the driving member is fixedly disposed on the operating member.

Preferably, the clamping unit comprises a clamping member rotatable around an axis parallel to the axial direction and a locking member for mating with the clamping member, and the clamping member comprises a mating portion is selectively matable with the driving member.

Preferably, wherein the driving member comprises a convex stand being disposed on the operating member, and the mating portion comprises a mating surface is selectively matable with the convex stand.

Preferably, the driving member is a round pin, and the mating portion is a mating groove mating with the round pin.

Preferably, the driving member comprises a first actuating surface and a second actuating surface that are disposed on the operating member, the mating portion comprises plurality of mating surfaces that are symmetrically disposed, and the first actuating surface and the second actuating surface are selectively clamped on two opposite mating surfaces.

To resolve the foregoing technical problem, another technical solution used by the present embodiment is: a clamping device, wherein the clamping device comprises: a mounting base; a clamping unit being configured to fasten a working tool in an axial direction; and an operation assembly, comprising an operating member and a driving member, wherein the operating member is foldably disposed on the mounting base around a movable rotating axis, and the operating member is operable to drive the driving member to selectively mate with and disengage from the clamping unit.

To resolve the foregoing technical problem, another technical solution used in the present embodiment is: a handheld tool, comprising a housing, a motor received in the housing, a spindle driven by the motor to perform a rotary motion, an output shaft being configured to mount a working tool, and an eccentric oscillating mechanism disposed between the spindle and the output shaft, and the eccentric oscillating mechanism is configured to convert the rotary motion of the spindle into an oscillation of the output shaft, and the hand-held tool further comprising a clamping device according to any one of the foregoing claims.

The clamping device and the hand-held tool having same of the present embodiment perform compound motion relative to the mounting base, so that the operating member can drive the driving member to move between a position where the driving member mates with the clamping unit and a position where the driving member disengages from the clamping unit. A working tool can be mounted or dismounted without using any aided tool, so that not only comfort of operation can be achieved, but also parts can be saved, thereby making the structure simpler and more reliable.

BRIEF DESCRIPTION OF THE DRAWINGS

FIG. 21 is a three-dimensional diagram of a head housing part of an oscillating power tool in a fourth implementation of the present embodiment;

FIG. 22 is a three-dimensional diagram of the head housing part of the oscillating power tool shown in FIG. 21, where an operating member is located at an open position;

FIG. 24 is a front view of a head housing part of an oscillating power tool in a fifth implementation of the present embodiment, where in this case, an operation assembly is in a disengaged mode;

FIG. 25 is a front view of the head housing part of the oscillating power tool shown in FIG. 24, where in this case, the operating member is in a mated mode;

DETAILED DESCRIPTION

The following further describes the present embodiment in detail with reference to the accompanying drawings and specific implementations.

A hand-held tool related to this implementation is specifically an oscillating-type hand-held tool, also referred to as an oscillating power tool. However, the present embodiment is not limited to the oscillating hand-held tool, and may alternatively be a rotary-type grinding hand-held tool such as a sander or an angle grinder.

Implementation 1

Figure 1:
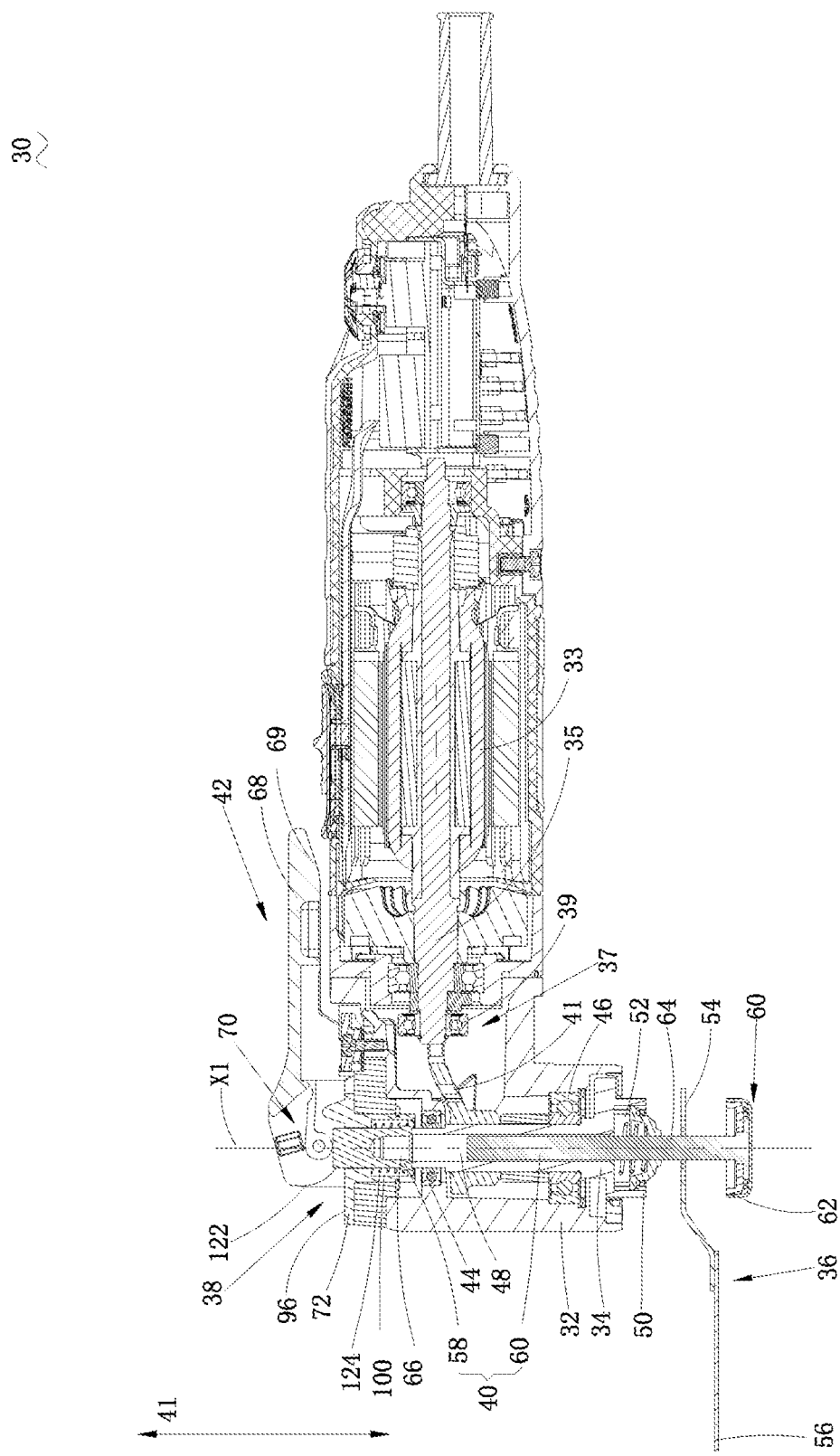
FIG. 1 is a sectional view of an oscillating power tool in a first implementation of the present embodiment, where in this case, a locking member has not been inserted into a clamping member, and an operating member is located at an initial position.

FIG. 1 shows an oscillating power tool 30 in this implementation. The oscillating power tool 30 has a housing 32, an output shaft 34 that extends out from the inside of the housing 32, a working tool 36 mounted on an end of the output shaft 34, and a clamping device 38 configured to fasten the working tool 36 on the end of the output shaft 34. The clamping device 38 includes a clamping unit 40 and an operation assembly 42. The clamping unit 40 is configured to clamp, in an axial direction 41, the working tool 36, and the operation assembly 42 is configured to drive the clamping unit 40. The axial direction 41 approximately extends along an axis X1 parallel to the output shaft 34.

When the oscillating power tool 30 operates, the output shaft 34 performs rotary oscillating motion around the axis X1 thereof, thereby producing relatively large mutation torques along two oscillating directions. Therefore, a quite large axial clamping force is needed to ensure that under all operating conditions, the foregoing working tool 36 is fixed on the output shaft 34, and does not slip, so that working efficiency is not affected, and an operating failure is avoided. The oscillating power tool 30 provided in this implementation can satisfy the foregoing needs. The oscillating power tool 30 can provide enough clamping force, and can quickly clamp or release the working tool 36 without using an additional aided tool.

A motor 33 is further disposed in the housing 32. The motor 33 has a spindle 35 and an eccentric transmission mechanism 37 that converts rotary motion output by the spindle 35 into oscillating motion of the output shaft 34. The eccentric transmission mechanism 37 includes an eccentric part 39 mounted on the spindle and a fork 41 sleeved on the output shaft 34. The eccentric part 39 is surrounded between two sliding surfaces of the fork 41. When the eccentric part 39 rotates, rotary motion of the eccentric part 39 is converted into oscillating motion of the output shaft 34 relative to the axis X1 of the output shaft 34 by mating with the fork 41. An oscillation angle is in a range of approximately 0.5 to 10 degrees, and an oscillation frequency range may be set to a range of approximately 5000 times per minute to 30000 times per minute. In this embodiment, an axis of the spindle is approximately perpendicular to the axis X1 of the output shaft 34. Preferably, the axis of the spindle and the axis X1 of the output shaft 34 are coplanar, constituting a central plane.

Referring again to FIG. 1, a straight line where the axis X1 of the output shaft 34 is defined as a longitudinal direction, and a direction perpendicular to the axis X1 is defined as a lateral direction. The bottom of a paper surface is defined as down, and the top of the paper surface is defined as up. The definitions herein are used in all the following descriptions. The output shaft 34 has a hollow shape, and is longitudinally supported between two rolling bearings 44 and 46 in the housing 32. An upper end of the output shaft 34 is received in the housing 32 and is provided with a cavity 48. A lower end of the output shaft 34 is provided with a flange 50 that extends out of the housing 32 and that is configured to mounting base the working tool 36. The flange 50 is further provided with an axial through-hole 52. The through-hole 52 communicates with the foregoing cavity 48.

The working tool 36 is a straight saw blade. Persons skilled in the art can easily conceive of that the working tool 36 may alternatively be another accessory, such as a circular saw blade, a frosted plate, or a scraper. The working tool 36 is laterally disposed, and has a plate-like attachment portion 54 configured to be mounted on the output shaft 34, and a cutting portion 56 configured to cut.

The clamping unit 40 includes a clamping member 58 capable of pivoting around an axis parallel to the axial direction 41 and a locking member 60 mating with the clamping member 58.

The locking member 60 is configured to fasten the working tool 36 on the flange 50 of the output shaft 34. The locking member 60 runs through the attachment portion 54 of the working tool 36 and the through-hole 52, and further extends into the cavity 48 of the output shaft 34. The locking member 60 includes an annular plate 62 located on the bottom and a rod 64 that extends upwards in an axial direction from the middle of the plate 62. An end of the rod 64 is provided with an external thread (not shown). After the rod 64 runs through the through-hole 52, the rod 64 cannot rotate relative to the output shaft 34. During mounting, the rod 64 of the locking member 60 runs through the cavity 48 of the output shaft 34, and is threadedly clamped to the clamping member 58, thereby fastening the working tool 36 on the flange 50 of the output shaft 34, and clamping the working tool 36 between a bottom surface of the flange 50 and a top surface of the plate 62.

The clamping member 58 is pivotally disposed on the housing 32 around the axis parallel to the axial direction 41, and is located on the upper end of the output shaft 34. Certainly, as understood by persons skilled in the art, the clamping member 58 may alternatively be rotationally disposed in the cavity 48 of the output shaft 34. The clamping member 58 is approximately annular, and is capable of freely rotating in the housing 32. The middle of the clamping member 58 is provided with a threaded hole 66 in an axial direction. The operation assembly 42 is rotated along a direction to drive the clamping member 58 to rotate relative to the axis X1, so that the threaded hole 66 of the clamping member 58 is threadedly clamped to the rod 64 of the locking member 60. In a clamped state, the operation assembly 42 is rotated along an opposite direction to drive the clamping member 58 to reversely rotate relative to the axis X1, so that the threaded hole 66 of the clamping member 58 is released from the rod 64 of the locking member 60.

It should be noted that, in this implementation, the locking member 60 is provided with the rod, and the clamping member 58 is provided with the threaded hole, but the present embodiment is not limited to this structure. Persons skilled in the art can easily conceive of that the rod may alternatively be disposed on the clamping member, and the threaded hole is disposed on the locking member. In this case, the locking member also needs to be set to be inrotatable relative to the output shaft. In addition, threaded mating and clamping mentioned in the present embodiment may be mating between common single-start threads, or mating between dual-start or multiple-start threads. The size of a thread is not limited, and the thread may be a coarse thread or a fine thread. The shape of the thread may be one of a triangle, a rectangle, a trapezium, and a sawtooth.

When performing the oscillating motion, the output shaft 34 drives the working tool 36 and the clamping unit 40 to oscillate together. Some of members of the operation assembly 42 in this implementation need to be disposed outside the housing, to facilitate a user to directly manually operate without using another aided tool. If the clamping unit 40 drives the operation assembly 42 to oscillate during oscillation of the clamping unit 40, operating feelings of the user are affected and even in some cases, a security problem occurs. Therefore, after the clamping unit 40 clamps the working tool 36, driving the operation assembly 42 to synchronously oscillate needs to be avoided.

In this implementation, the operation assembly 42 has a mated mode and a disengaged mode, so that the operation assembly 42 is selectively connected to the clamping unit 40 without relative rotation. When the clamping member 58 and the locking member 60 need to be clamped or released relative to each other, the operation assembly 42 is selectively set to be in the mated mode, the operation assembly 42 is connected to the clamping unit 40 without relative rotation, and then the clamping member 58 may be directly driven. When the clamping member 58 needs to operate after clamping, the operation assembly 42 is selectively set to be in the disengaged mode, and the operation assembly 42 can rotate relative to the clamping unit 40, so that the operation assembly 42 is not affected by oscillation of the clamping unit 40.

Figure 2:
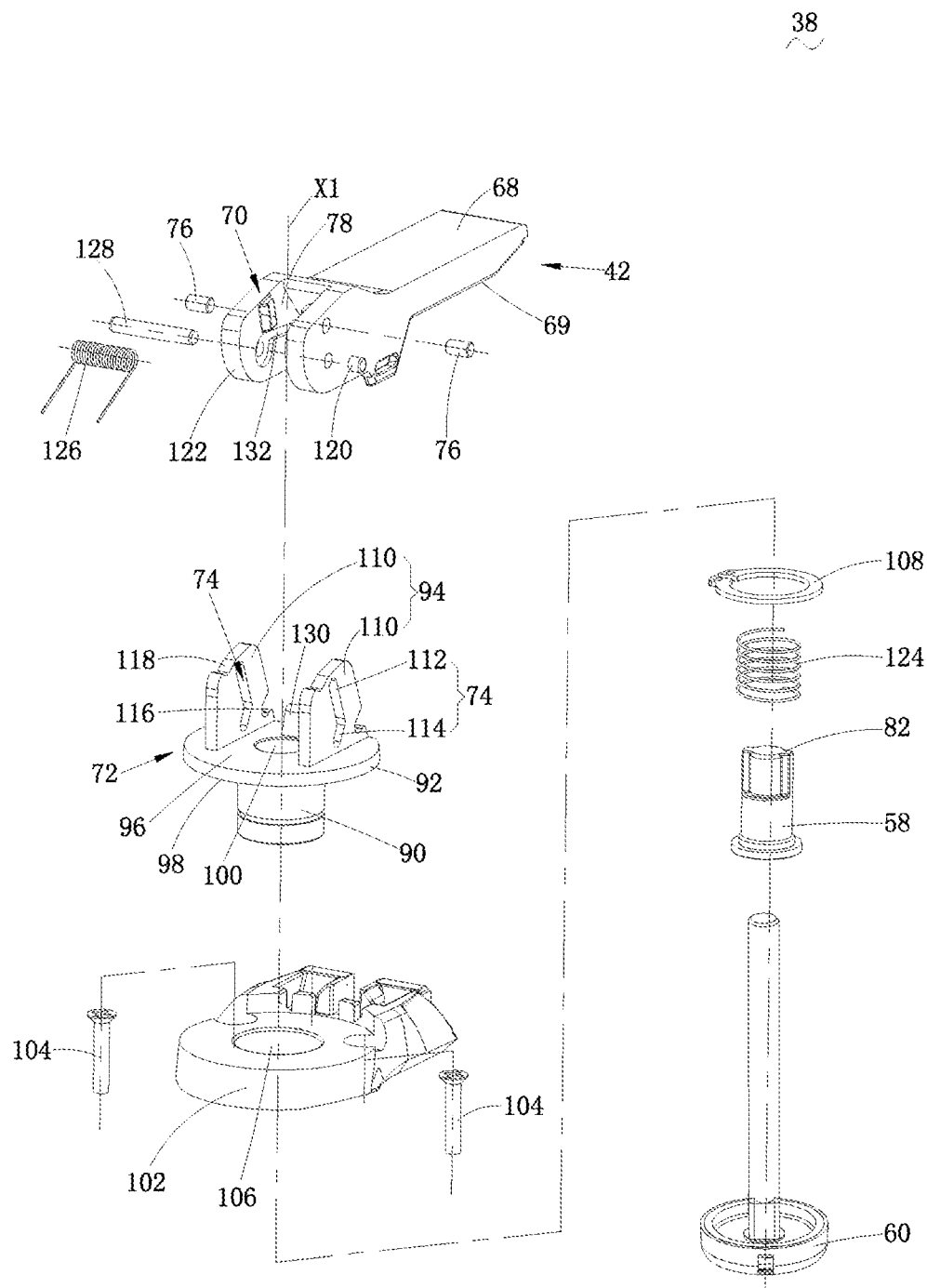
FIG. 2 is a schematic three-dimensional exploded view of some of members in the oscillating power tool shown in FIG. 1.
Figure 3:
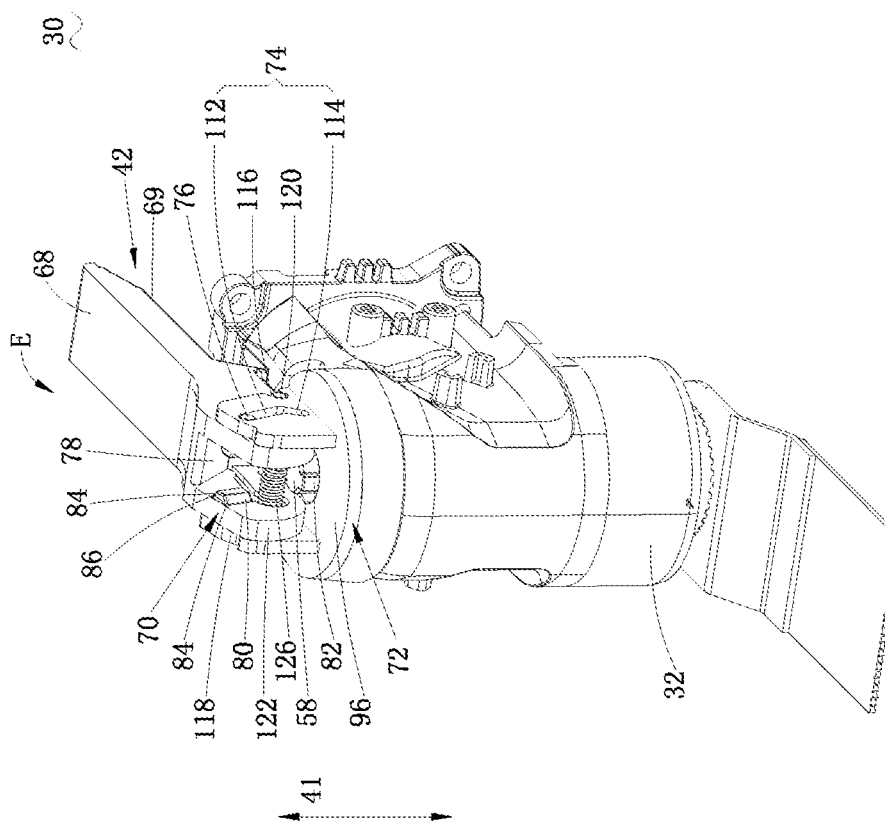
FIG. 3 is a three-dimensional diagram of a head housing part of the oscillating power tool shown in FIG. 1.

Referring to FIG. 2 and FIG. 3, the operation assembly 42 includes an operating member 68 and a driving member 70. The operating member 68 is operable to drive the driving member 70 to move between a position where the driving member 70 mates with the clamping unit 40 and a position where the driving member 70 disengages from the clamping unit 40. The driving member 70 mates with the clamping unit 40. The operating member 68 is connected to the clamping unit 40 without relative rotation. In this case, the operation assembly 42 is in the mated mode. The driving member 70 disengages from the clamping unit 40, and the operating member 68 is rotatable relative to the clamping unit 40. In this case, the operation assembly 42 is in the disengaged mode. Herein, a direction towards which the driving member 70 mates with the clamping unit 40 is defined as a mated direction (represented by an arrow E in FIG. 3), and a direction opposite thereto is defined as a disengaged direction.

The clamping device 38 includes a mounting base 72 rotatably disposed on the housing 32 around the axis parallel to the axial direction 41. The operating member 68 is movably mounted on the mounting base 72, so that the operating member 68 can rotate around the axis parallel to the axial direction 41 together with the mounting base 72. Preferably, the mounting base 72 rotates around the axis X1. The operating member 68 further includes an operating portion 69 for use by an operator.

The mounting base 72 is provided with a guiding groove 74, and the operating member 68 is provided with a guiding member 76. Herein, the guiding groove 74 has a guiding surface that longitudinally extends, and the guiding member 76 is rotatable and sliding along the guiding surface. Therefore, the operating member 68 can be inversely disposed on the mounting base 72 around a movable rotating axis, so that the driving member 70 mates with and disengages from the clamping unit 40. Herein, the operating member 68 is inversely disposed and rotates around the movable rotating axis. There is no fixed axis of rotation. The movable rotating axis is perpendicular to the axis X1 of the output shaft 34, that is, perpendicular to the axial direction. Preferably, the movable rotating axis is perpendicular to the central plane. The movable rotating axis linearly moves in a plane perpendicular to the movable rotating axis. A linear trace of the movable rotating axis includes a straight line, a curved line, a polyline, an arc line, or a combination of at least two of a straight line, a curved line, a polyline, or an arc line. In this embodiment, the trace of the linear movement is a polyline. Therefore, the operating member 68 not only rotates, but also linearly moves, and performs compound motion relative to the mounting base 72. In this way, not only comfort of operation can be achieved, but also parts can be saved, thereby making the structure simpler and more reliable. The compound motion may alternatively have a fixed motion trace, and the operation is more convenient.

Certainly, as understood by persons skilled in the art, positions of the guiding groove 74 and the guiding member 76 may also be exchanged. For example, the guiding groove 74 is disposed on the operating member 68, and the guiding member 76 is disposed on the mounting base 72. In this way, the inventive concept of the present embodiment can also be implemented.

The driving member 70 is fixedly disposed on the operating member 68. Certainly, the driving member 70 and the operating member 68 may alternatively be integrally formed. The operating member 68 is provided with a groove 78, and the driving member 70 is fixedly disposed on an inner wall of the groove 78. Herein, the driving member 70 includes a convex stand 80 disposed on the inner wall of the groove 78. A mating portion 82 mating with the driving member 70 is disposed on the clamping member 58. As shown in FIG. 3, the convex stand 80 is dislocated, in the axial direction 41, from the mating portion 82 on the clamping member 58. The convex stand 80 and the mating portion 82 disengage from each other. In this case, the operation assembly 42 is in the disengaged mode, and the operating member 68 cannot drive the clamping unit 40 to rotate. After the operating member 68 inverts, the convex stand 80 is enabled to mate with the mating portion 82 on the clamping member 58, and the operation assembly 42 is in the mated mode, so that the operating member 68 can drive the clamping member 58 to rotate around the axis X1 after being driven.

Figure 4:
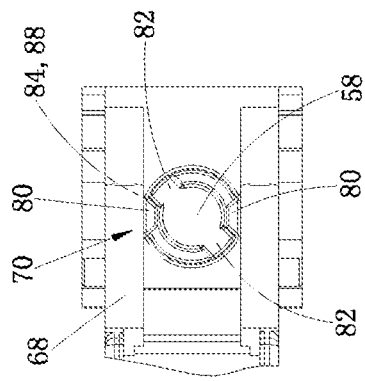
FIG. 4 is a partial top view of the oscillating power tool shown in FIG. 1, where a driving member does not mate with the clamping member.

Referring to FIG. 3 and FIG. 4, the convex stand 80 includes two side surfaces 84 connected to the operating member 68 and a connecting surface 86 connecting the two side surfaces. The two side surfaces 84 selectively mate with the clamping member 58. The mating portion 82 includes two opposite mating surfaces 88 that selectively mate with the driving member 70. The two opposite mating surfaces 88 are disposed parallel to each other, and the two side surfaces 84 are disposed oblique to each other. Certainly, the two opposite mating surfaces 88 may alternatively be oblique to each other, and the two side surfaces 84 are parallel to each other; or the two opposite mating surfaces 88 and the two side surfaces 84 are both disposed oblique to each other or parallel to each other.

In this implementation, the driving member 70 includes two convex stands 80 that are symmetrically disposed on the operating member 68, and two mating portions 82 that are symmetrically disposed are disposed on the clamping member 58. Certainly, as understood by persons skilled in the art, there may be any number of convex stands 80 and any number of mating portions 82, and the inventive concept of the present embodiment can be implemented anyway. Certainly, the specific form of mating between the driving member 70 and the mating portion 82 is not limited to this implementation. The specific form may alternatively be mating between teeth, mating between a groove and a protrusion, and the like, as long as the driving member 70 is enabled to drive the clamping member 58 to rotate when mating with the clamping member 58.

Figure 5:
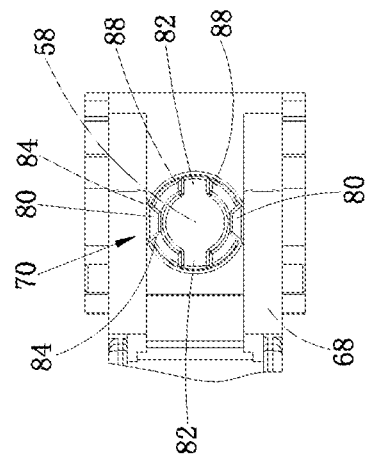
FIG. 5 is a partial top view of the oscillating power tool shown in FIG. 1, where the driving member mates with the clamping member.

As shown in FIG. 4, if after the operating member 68 inverts, the convex stand 80 is located beside the mating portion 82, and any side surface 84 of the convex stand 80 does not abut against any mating surface 88, in this case, the operating member 68 needs only to be rotated by a particular angle. As shown in FIG. 5, a side surface 84 of the convex stand 80 is enabled to abut against a mating surface 88 of the mating portion 82, and the driving member 70 is enabled to mate with the clamping member 58, thereby driving the operating member 68 to drive the clamping member 58 to rotate around the axis X1.

Referring again to FIG. 2 and FIG. 3, the mounting base 72 is located on an upper portion of the housing 32, and can be rotatably disposed on the housing 32 around the axis X1. The mounting base 72 includes a connecting portion 90 having a cylindrical shape, an attachment plate 92 connected to the connecting portion 90, and a bracket 94 connected to the attachment plate 92.

The attachment plate 92 includes an upper surface 96 and a lower surface 98 that are oppositely disposed. The upper surface 96 of the attachment plate 92 is provided with an inner hole 100 that extends in the axial direction, and the inner hole 100 runs through the connecting portion 90, thereby facilitating the clamping member 58 to run through. During mounting, the clamping member 58 runs through the inner hole 100, and enables the mating portion 82 to be at least partially located above the upper surface 96 of the attachment plate 92.

The clamping device 38 further includes a fixed seat 102, and the fixed seat 102 is fixedly connected to the housing 32 by using a bolt 104. Herein, the connecting portion 90 extends in the axial direction from the lower surface 98, and the outer diameter of the connecting portion 90 is basically equal to the inner diameter of a connecting hole 106 on the fixed seat 102, so that the connecting portion 90 can be inserted into the fixed seat 102, enabling the mounting base 72 to rotate relative to the fixed seat 102. The mounting base 72 is clamped in the fixed seat 102 by using an axial retainer ring 108, to be prevented from moving in the axial direction.

In this implementation, two guiding grooves 74 are symmetrically disposed on the bracket 94. The bracket 94 includes two side boards 110 that are separately disposed on the attachment plate 92, and the two guiding grooves 74 are respectively disposed on the two side boards 110. Certainly, the two side boards 110 may alternatively be connected together.

The guiding groove 74 includes a first groove 112 and a second groove 114 that communicate with each other, and an angle between the first groove 112 and the second groove 114 is preferably an obtuse angle. At least one of the first groove 112 and the second groove 114 is obliquely disposed relative to the axial direction. In this implementation, the first groove 112 and the second groove 114 are both obliquely disposed relative to the axial direction 41.

Certainly, the specific shape of the guiding groove 74 is not limited to only this implementation. For example, the guiding groove may be a strait-line groove, and the strait-line groove may be disposed parallel to the axial direction 41 or obliquely disposed relative to the axial direction 41.

Further, the side board 110 is further provided with a mating groove 116 and a stopping groove 118, and the operating member 68 is further provided with a stopping pin 120. When the operating member 68 is located at different positions, the stopping pin 120 is selectively located in the mating groove 116 or the stopping groove 118.

Herein, the stopping pin 120 and the stopping groove 118 constitute a stopping mechanism and the function thereof will be described below in detail. Certainly, the stopping mechanism is not limited to only that the stopping groove is disposed on the side board, and that the stopping pin is disposed on the operating member. The stopping groove may alternatively be disposed on the operating member, and the stopping pin is disposed on the side board. Described descriptions will be provided in a second implementation.

The guiding member 76 is a cylindrical pin 76. Two cylindrical pins 76 are symmetrically disposed on the operating member 68, and are respectively received in the guiding grooves 74. Certainly, the two cylindrical pins may alternatively be connected into one cylindrical pin, and two ends of the cylindrical pin respectively rotate and slide in the guiding grooves. By using the guiding groove 74 and the cylindrical pin 76 that is rotatable and sliding in the guiding groove 74, the operating member 68 is enabled to rotate relative to the housing 32 and around the movable rotating axis. A motion trace of the cylindrical pin 76 in the guiding groove 74 may be from top to bottom along the axial direction 41, or that the cylindrical pin 76 first moves upwards along the axial direction 41, and then moves from top to bottom.

In this implementation, the guiding member 76 is in interference fit with a hole on the operating member 68. Certainly, as familiar to persons skilled in the art, there are still lots of manners of connection between the guiding member 76 and the operating member 68, such as welding and threaded connection.

As stated above, symmetric guiding members and guiding grooves are disposed to facilitate the operator to operate the operating member 68. Certainly, if the guiding member and the guiding groove that mate with each other are disposed on only one side, the operating member 68 can also perform the compound motion relative to the housing 32.

To make the operation more smooth, the operating member 68 is provided with a cam surface 122 mating with the mounting base 72. The cam surface 122 includes two pressing surfaces with different diameters. The cam surface 122 abuts against the upper surface 96 of the mounting base, and the cylindrical pin 76 rotates and slides in the guiding groove 74, so that the operating member 68 can smoothly invert relative to the housing 32, and the operating member 68 can drive the convex stand 80 to move between mating with and disengagement from the clamping member 58 and mating with the clamping member 58.

Certainly, the specific shape of the cam surface 122 is not limited to only two pressing surfaces with different diameters, and may alternatively be set to other smooth curved surfaces.

Referring to FIG. 1, FIG. 3, FIG. 6 and FIG. 8 together, the operation assembly 42 moves from an initial position to an open position. As shown in FIG. 1 and FIG. 3, at the initial position, the operating member 68 is attached to the top of the housing 32. In this case, the operating member 68 may be clamped on the housing 32 by using a clamping structure (not numbered). In this case, to facilitate clamping the operating member 68 in the housing 32, the mating groove 116 disposed on the side board 110 is configured to accommodate the stopping pin 120. The clamping member 58 is received in the inner hole 100 on the mounting base 72, and is, movably in the axial direction, supported on a top end of the output shaft 34. Herein, the clamping member 58 is received in the mounting base 72 and is rotatable relative to the mounting base 72, and is also capable of, or together with the mounting base 72, rotating relative to the fixed seat 102. Further, an elastic member 124 is disposed between a bottom end of the clamping member 58 and an inner wall of the mounting base 72, to provide a spring force for mating by the clamping member 58 towards the locking member 60. Further referring to FIG. 3, when the operating member 68 is located at the initial position, the convex stand 80 is dislocated, in the axial direction 41, from the mating portion 82 on the clamping member 58. The convex stand 80 and the mating portion 82 disengage from each other. That is, they are in the disengaged mode. In this case, the convex stand 80 is relatively far away from the upper surface 96 of the mounting base 72.

Figure 6:
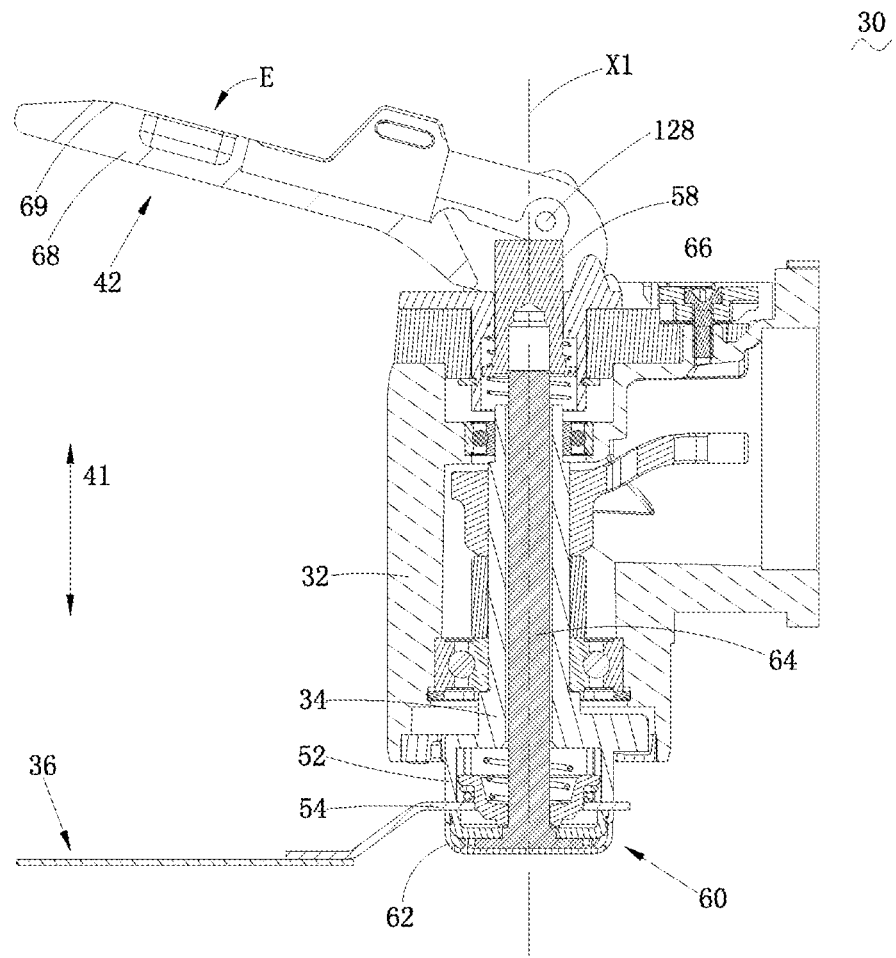
FIG. 6 is a sectional view of the head housing part of the oscillating power tool shown in FIG. 1, where in this case, the locking member has just been inserted into the clamping member, and the operating member is located at an open position.
Figure 8:
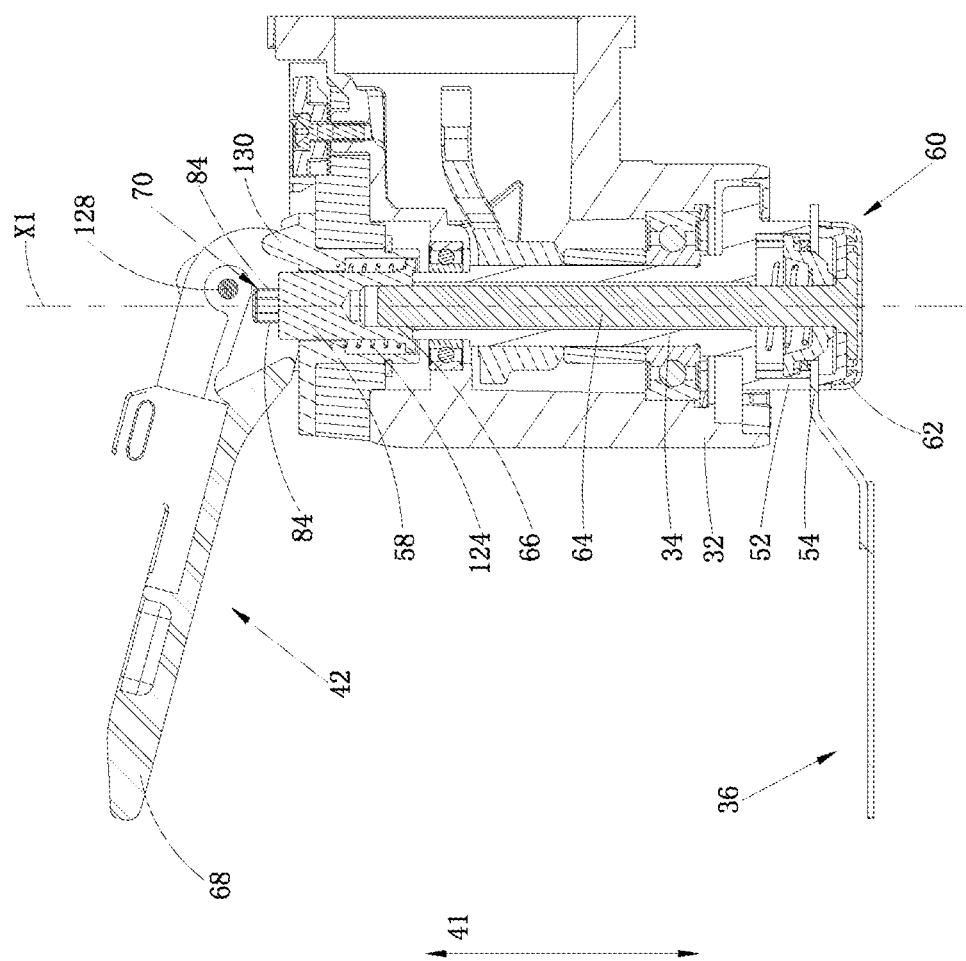
FIG. 8 is a sectional view of the head housing part of the oscillating power tool shown in FIG. 1, where in this case, the operating member drives the clamping member to rotate relative to the locking member.

Herein, a force is applied to the operating portion 69, and the operation assembly 42 abuts against the upper surface 96 of the mounting base 72 by using the cam surface 122. That is, the operating member 68 drives the driving member 70 to move along the mated direction E. In addition, the cylindrical pin 76 rotates and slides in the guiding groove 74, so that the operating member 68 inverts to the open position, as shown in FIG. 6 and FIG. 8. In this case, the stopping pin 120 mates with the stopping groove 118 (not shown), so as to prevent the operating member 68 from further moving along the mated direction E, that is, prevent the driving member 70 from disengaging from the clamping member 58. Certainly, the operating portion 69 is prevented from further moving towards a direction close to the working tool 36. In this way, the driving member 70 is prevented from disengaging from the clamping member 58, ensuring that the working tool is smoothly dismounted and mounted.

In this case, the convex stand 80 moves downwards in the axial direction 41 relative to the initial position. That is, the convex stand 80 at least partial overlaps, in the axial direction 41, with the mating portion 82 on the clamping member 58, and the convex stand 80 is relatively close to the upper surface 96 of the mounting base 72. Further referring to FIG. 5, the driving member 70 is capable of mating with the mating portion 82 on the clamping member 58, thereby driving the clamping member 58 to rotate together, so that the clamping member 58 is threadedly clamped to the locking member 60. Apparently, after the clamping member 58 and the locking member 60 are clamped to each other, then the operation assembly 42 is wrenched back from the open position to the initial position, and the convex stand 80 moves upwards in the axial direction 41 relative to the open position, so that the convex stand 80 disengages from the mating portion 82 on the clamping member 58. It can be seen that in the inversion process of the operating member 68, the driving member 70 has a displacement in the axial direction, and for better mating with the clamping member 58, the driving member 70 may also have a displacement in a radial direction.

Referring again to FIG. 2 and FIG. 3, an elastic member 126 is disposed between the mounting base 72 and the operating member 68, and the elastic member 126 provides a spring force to push the operating member 68 to be located at the open position. In this way, it is convenient for the operator to invert the operating member 68 to the open position. Specifically, a positioning pin 128 is disposed on the operating member 68, a positioning block 130 is disposed on the mounting base 72, the elastic member 126 is sleeved on the positioning pin 128, one end of the elastic member 126 is clamped on the positioning block 130, and the other end of the elastic member 126 is clamped in a stuck groove 132 of the operating member 68. Certainly, two elastic members 126 may alternatively be disposed, and are respectively mounted on outer sides of the two side boards 110, or the elastic member 126 is disposed on an outer side of any side board 110, and both of the manners can provide the spring force to push the operating member 68 to be located at the open position, and facilitate the operator to move the operating member 68 along the mated direction E.

Figure 9:
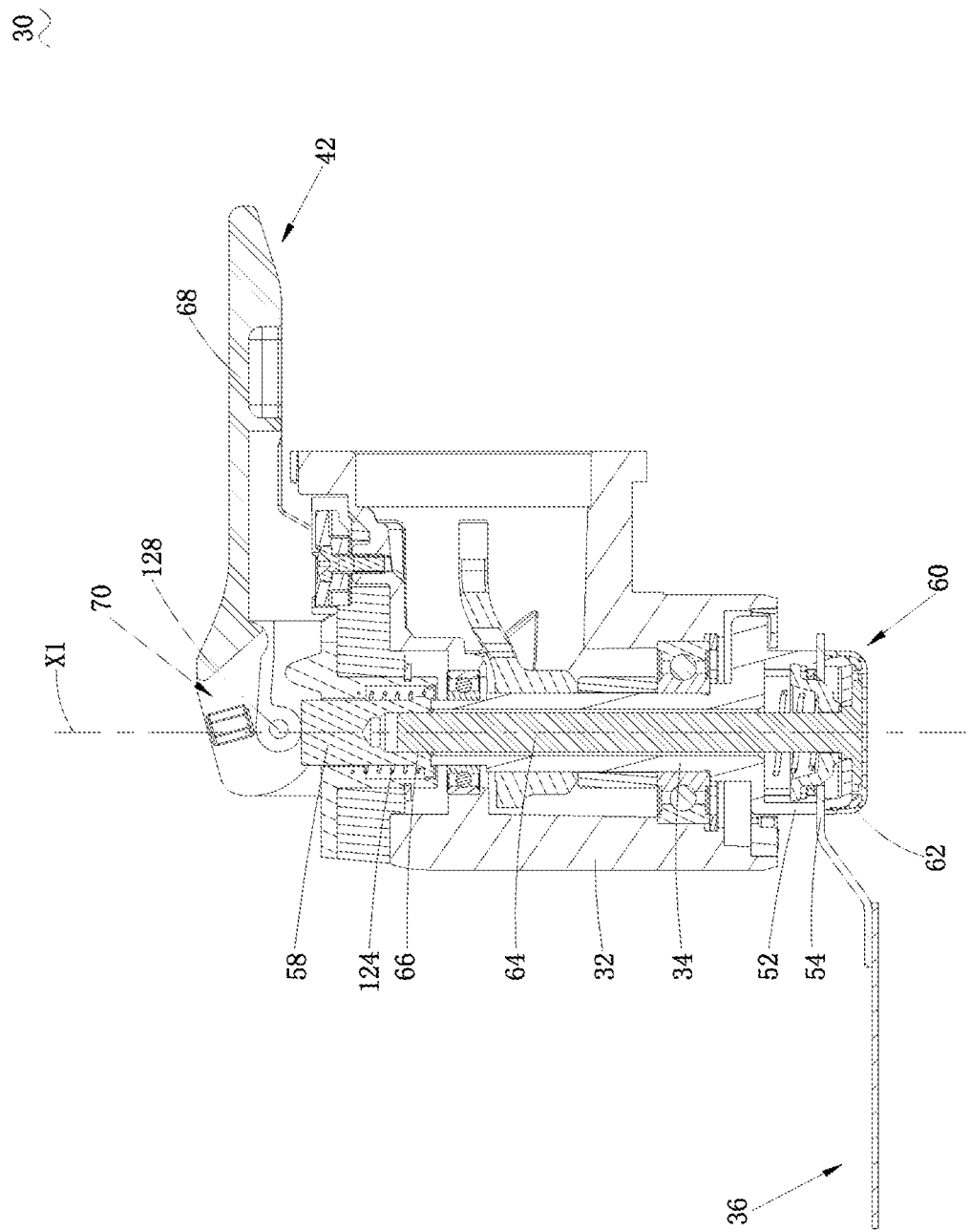
FIG. 9 is a sectional view of the head housing part of the oscillating power tool shown in FIG. 1, where in this case, the driving member disengages from the clamping member, and the operating member is located at an initial position.

Referring to FIG. 1, FIG. 6, FIG. 8 and FIG. 9, with reference to schematic diagrams of four positions of the oscillating power tool 30, a specific operating method for mounting the working tool 36 of the oscillating power tool 30 is specifically described. In FIG. 1, the oscillating power tool 30 is located at a first position. In this case, the operating member 68 is located at the initial position, and the locking member 60 is inserted into the output shaft 34, but has not been inserted into the clamping member 58. In FIG. 6, the oscillating power tool 30 is located at a second position. In this case, the operating member 68 inverts to the open position, and the driving member 70 is capable of mating with the clamping member 58. In this case, the locking member 60 has just been inserted into the clamping member 58, but screwing of the clamping member 58 has not been started. In FIG. 8, the oscillating power tool 30 is located at a third position. In this case, after the operating member 68 rotates by plurality of rounds, the clamping member 58 is clamped, in the axial direction, to the locking member 60. In FIG. 9, the oscillating power tool 30 is at a fourth position. In this case, the operating member 68 is restored to the initial position, and the driving member 70 disengages from the clamping member 58. The following will describe a specific operating process in detail.

As shown in FIG. 1, first, the working tool 36 is mounted between the flange 50 of the output shaft 34 and the locking member 60, and the locking member 60 is inserted into an inner cavity 44 of the output shaft 34. If an opening on the attachment portion 54 of the working tool 36 is closed, the locking member 60 needs to be completely disengaged from the clamping member 58, to be removed from the output shaft 34, and then the locking member 60 is mounted into the output shaft 34 after running through the opening of the working tool 36. If the opening of the working tool is processed as non-closed and a notch for the rod of the locking member to run through is left, the locking member does not need to be completely removed from the clamping member, and the clamping member needs only to be unscrewed, so that a gap for the attachment portion of the working tool to run through is left between the locking member and a receiving portion of the output shaft.

As shown in FIG. 6, the locking member 60 is inserted into the threaded hole 66 of the clamping member 58, so that the external thread on a top end of the rod 64 of the locking member 60 comes into contact with the threaded hole 66 of the clamping member 58, and the clamping member 58 is pushed to move by a particular distance in the axial direction until the plate 62 of the locking member 60 abuts against a lower surface of the attachment portion 54 of the working tool 36, and an upper surface of the attachment portion 54 of the working tool 36 abuts against a lower surface of the flange 50 of the output shaft 34.

Figure 7:
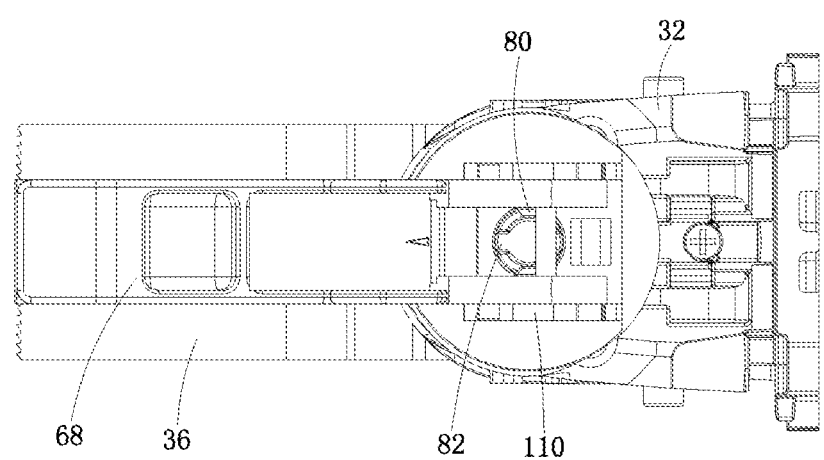
FIG. 7 is a top view of the head housing part of the oscillating power tool shown in FIG. 6.

The operating portion 69 is moved along the mated direction, so that the operating member 68 is operated from the initial position to the open position. Then referring to FIG. 7, the convex stand 80 is located just beside the mating portion 82. The operating member 68 is rotated to enable the convex stand 80 to mate with the mating portion 82 (refer to FIG. 5), so that the operating member 68 is capable of driving the clamping member 58 to rotate relative to the locking member 60. Because the threaded hole 66 of the clamping member 58 threadedly mates with the rod of the locking member 60, under an effect of a thread tightening force, the clamping member 58 moves downwards in the axial direction during rotation.

If in the inversion process, the operating member 68 has not moved to a completely open position, and the convex stand 80 is located just above the mating portion 82 and is stopped by the mating portion 82, preventing the operating member 68 from further moving, in this case, the operating member 68 needs only to be rotated, so that the convex stand 80 gives way to the mating portion 82 and is located beside the mating portion 82, and the foregoing step is repeated.

As shown in FIG. 8, rotation of the operating member 68 is continued, to drive the clamping member 58 to further move downwards by using the driving member 70, and axial gaps among the working tool 36, the locking member 60, and the flange 50 of the output shaft 34 are eliminated until it is felt that it is difficult to rotate the operating member 68. In this case, quite large axial positive pressure separately exists among the working tool 36, the locking member 60, and the flange 50, and quite large friction forces correspondingly exist, so as to transfer enough torques to prevent the working tool 36, the locking member 60, and the flange 50 of the output shaft 34 from sliding relative to each other, so that the operating efficiency is not affected.

The operating member 68 is located at the open position, the driving member 70 mates with the clamping member 58, and a longitudinal extension direction of the convex stand 80 is parallel to the axial direction 41. That is, extension directions of the two side surfaces 84 of the convex stand 80 are parallel to the axial direction 41, so that in the process of rotating around the axis X1, the convex stand 80 can also mate quite well with the mating portion 82 on the clamping member 58.

As shown in FIG. 9, after the clamping member 58 and the locking member 60 are completely clamped to each other, the operating portion 69 is moved along a disengaged direction, so that the operating member 68 is restored to the initial position. In this case, the driving member 70 disengages from the clamping member 58, thereby preventing the clamping member 58 from driving the operation assembly 42 to oscillate together.

By means of the foregoing descriptions of the operating steps of mounting the working tool 36, it is quite easy to understand that only opposite operation needs to be performed to dismount the working tool 36. When the working tool 36 needs to be dismounted, the operation assembly 42 needs only to be rotated to the open position and the driving member 70 is enabled to mate with the clamping member 58. Then the operation assembly 42 is rotated counter-clockwise, and drives, by using the driving member 70, the clamping member 58 to rotate relative to the locking member 60, so that a threaded connection is relieved and the locking member 60 moves downwards by a particular distance in the axial direction. Finally, the operation assembly 42 is operated to continue to operate until the clamping member 58 and the locking member 60 completely disengage from the threaded connection. In this case, the locking member 60 can be dismounted from the output shaft 34 and the working tool 36 is removed.

Implementation 2

Figure 10:
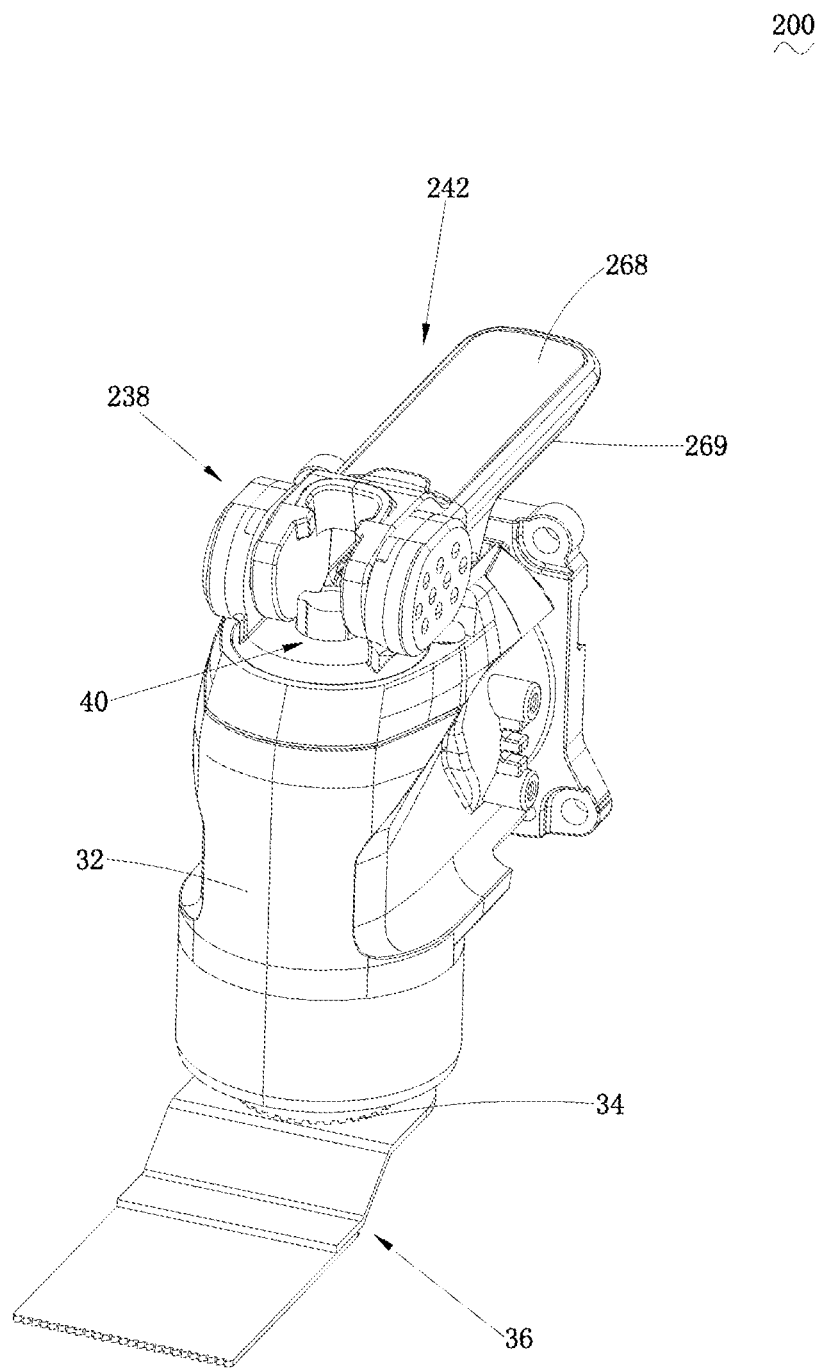
FIG. 10 is a three-dimensional diagram of a head housing part of an oscillating power tool in a second implementation of the present embodiment.

As shown in FIG. 10, a second implementation of the present embodiment provides an oscillating power tool 200, including, same as the oscillating power tool 30 in the first implementation, a housing 32, an output shaft 34 that extends out from the inside of the housing 32, a working tool 36 mounted on an end of the output shaft 34, and a clamping device 238 configured to fasten the working tool 36 on the end of the output shaft 34. The clamping device 238 includes a clamping unit 40 and an operation assembly 242. Specific structures and principles of the clamping unit 40 and the operation assembly 242 are basically the same as those in the first implementation. The following mainly describes structures different from those in the first implementation.

Figure 11:
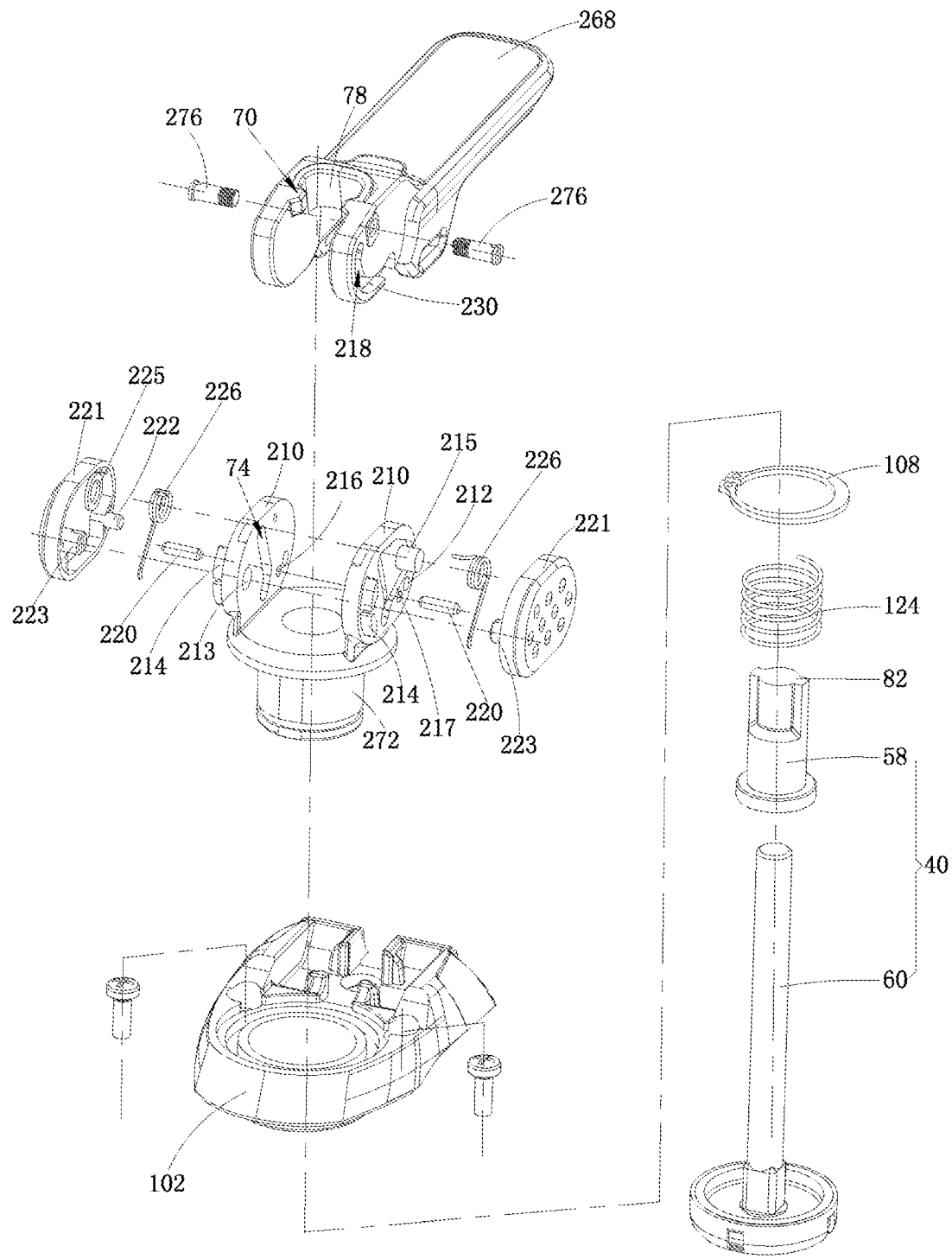
FIG. 11 is a schematic three-dimensional exploded view of some of members in the oscillating power tool shown in FIG. 10.

Referring to FIG. 11, this implementation differs from the first implementation in a mounting position of an elastic member 226 disposed between a mounting base 272 and an operating member 268. In this implementation, a cover board 221 is disposed on an outer side of each side board 210. A first positioning column 222 and a second positioning column 223 are disposed on each cover board 221. A first positioning hole 212 and a second positioning hole 213 are disposed on each side board 210. The first positioning column 222 mates with the first positioning hole 212, and the second positioning column 223 mates with the second positioning hole 213, so as to mounting base the cover board 221 on the side board. Certainly, an elastic block 214 clamped to a side wall of the cover board 221 may further be disposed on the side board 210, to better fasten the cover board 221.

Positioning pins 215 (the positioning pins 215 are symmetrically disposed, and the figure shows only one) are further disposed on the side board 210, and received grooves 225 receiving the positioning pins 215 (the received grooves 225 are symmetrically disposed, and the figure shows only one) are disposed on the cover board 221. The elastic member 226 is sleeved on the positioning pin 215, one end of the elastic member 226 is clamped on the side board 210 by using a hole on the side board 210, and the other end of the elastic member 226 is clamped on a guiding member 276. In this way, the elastic member 226 provides a spring force to push the operating member 268 to be located at the open position, to facilitate the operator to invert the operating member 268 to the open position.

As stated above, two elastic members 226 are symmetrically disposed, to facilitate balanced force application. Certainly, there may be only one elastic member 226 disposed on one side of the mounting base 272.

Same as the first implementation, the mounting base 272 in this implementation is provided with a guiding groove 74, the operating member 268 is provided with a guiding member 276, and the guiding member 276 is rotatable and sliding along the guiding groove 74. Therefore, the operating member 268 can be inversely disposed on the mounting base 272, so that the driving member 70 mates with and disengages from the clamping unit 40. Referring to FIG. 11, this implementation differs from the first implementation in a mounting manner of the guiding member 276 and the operating member 268. In this implementation, the operating member 268 is provided with a threaded hole, and the guiding member 276 runs through the guiding groove 74 to mate with the threaded hole.

Same as the first implementation, the clamping device 238 in this implementation also includes a stopping mechanism disposed between the mounting base 272 and the operating member 268. When the driving member 70 mates with the clamping unit 40, the stopping mechanism is configured to prevent the operating member 268 from further moving along the mated direction, that is, prevent the driving member 70 from disengaging from the clamping unit 40. The present implementation further differs from the first implementation in that: continuing to refer to FIG. 11, in this implementation, the stopping mechanism includes a stopping groove 218 disposed on the operating member 268, and a stopping pin 220 disposed on the mounting base 272.

Specifically, the stopping pin 220 is fixedly mounted on the side board 210 of the mounting base 272. The stopping pin 220 may be a cylindrical pin, and is in interference fit with a hole 216 on the side board 210. Certainly, as familiar to persons skilled in the art, the sectional shape of the stopping pin 220 is not limited, and there are also lots of manners of connection between the stopping pin 220 and the side board 210, such as welding and threaded connection.

In this implementation, the stopping groove 218 is a groove of which one end is open, and the other end is closed, rather than a through groove. That is, the stopping groove 218 does not have an inner wall running through the groove 78. The stopping groove 218 includes a cavity 230 that accommodates the stopping pin 220. In the inversion process of the operating member 268 relative to the mounting base 272, the stopping pin 220 is capable of freely moving in the cavity 230.

Figure 12:
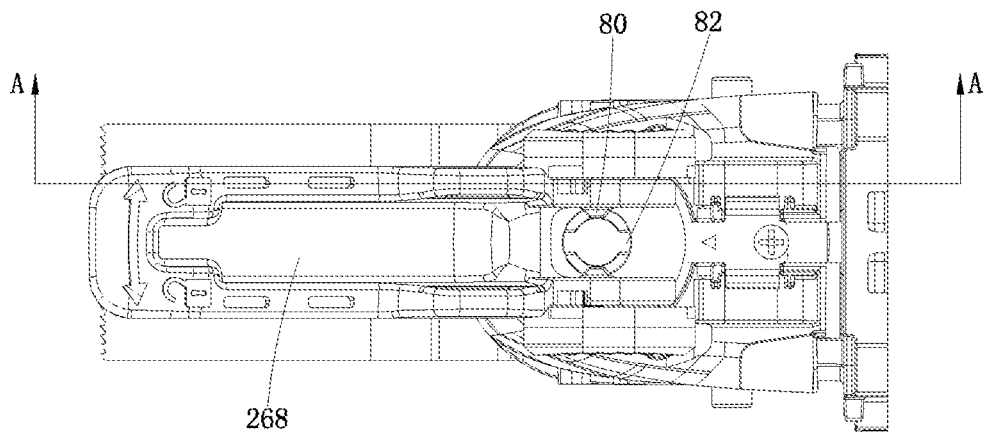
FIG. 12 is a top view of the head housing part of the oscillating power tool shown in FIG. 10, where in this case, an operating member is located at an open position, and can mate with a clamping member only by means of slight rotation.

Referring to FIG. 10, an operating portion 269 is moved along the mated direction, so that the operating member 268 is operated from the initial position to the open position. Then referring to FIG. 12, the convex stand 80 is located just beside the mating portion 82. The operating member 268 is rotated to enable the convex stand 80 to mate with the mating portion 82, so that the operating member 268 is capable of driving the clamping member 58 to rotate relative to the locking member 60. Because the threaded hole 66 of the clamping member 58 threadedly mates with the rod of the locking member 60, under an effect of a thread tightening force, the working tool 36 is mounted or dismounted.

Figure 13:
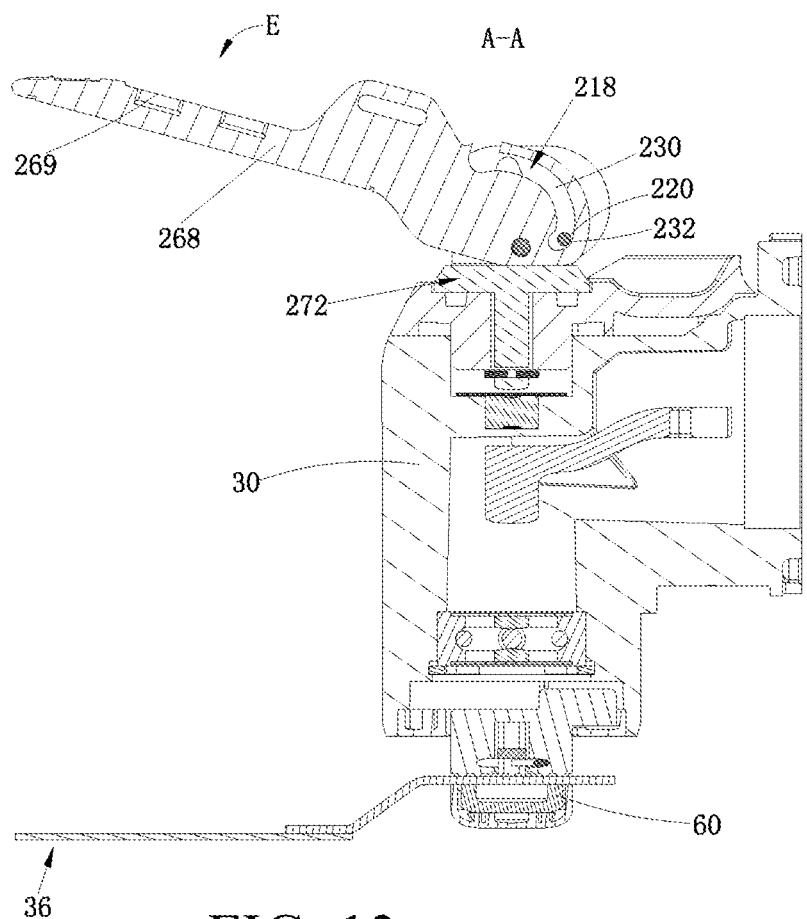
FIG. 13 is a sectional view along a line A-A of FIG. 12.

In this case, referring to FIG. 13, the stopping groove 218 includes a critical stopping portion 232 in communication with the cavity 230. When the driving member 70 mates with the clamping unit 40, the stopping pin 220 is stopped by the critical stopping portion 232, for preventing the operating member 268 from further moving along the mated direction E, that is, preventing the driving member 70 from disengaging with the clamping member 58. Certainly, the operating portion 269 is prevented from further moving towards a direction close to the working tool 36. In this way, the driving member 70 is prevented from disengaging from the clamping member 58, thereby ensuring that the working tool is smoothly dismounted and mounted.

Figure 14:
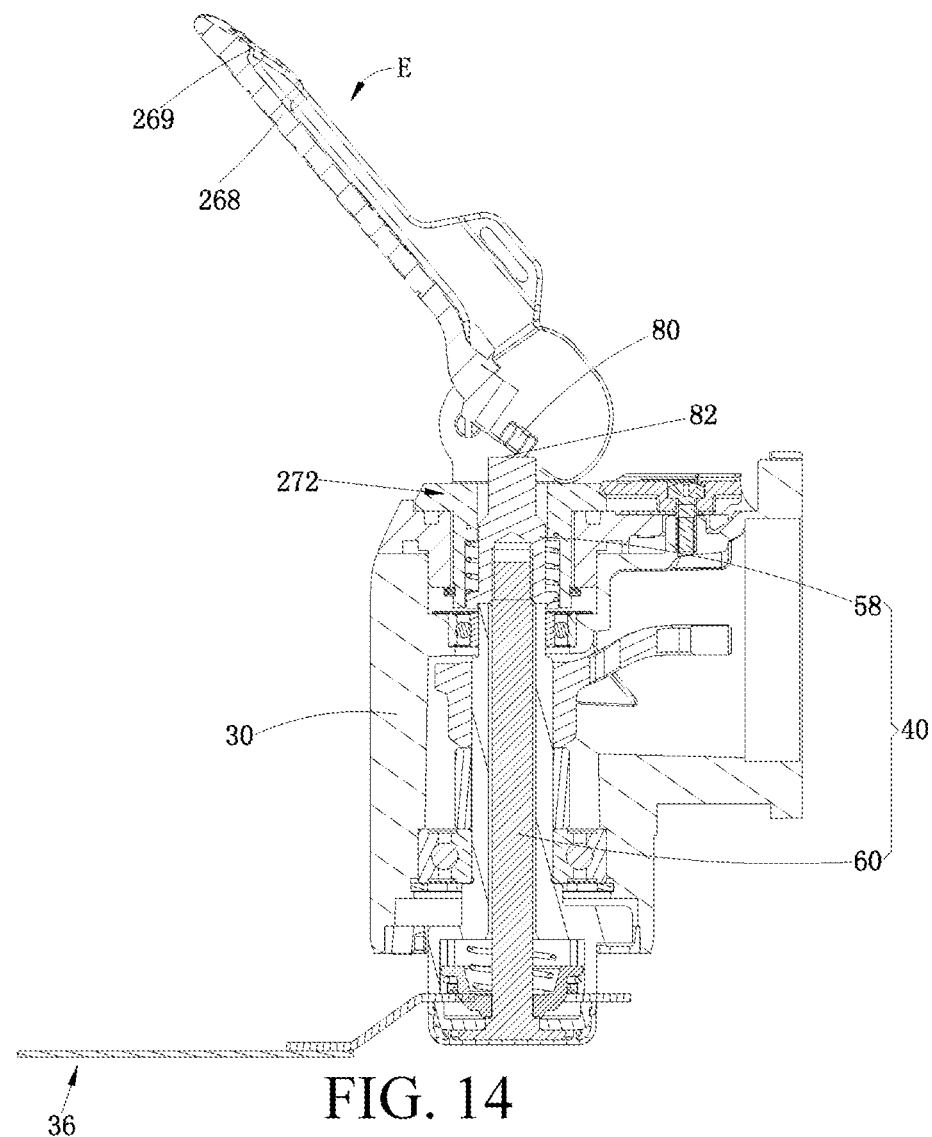
FIG. 14 is a top view of the head housing part of the oscillating power tool shown in FIG. 10.
Figure 15:
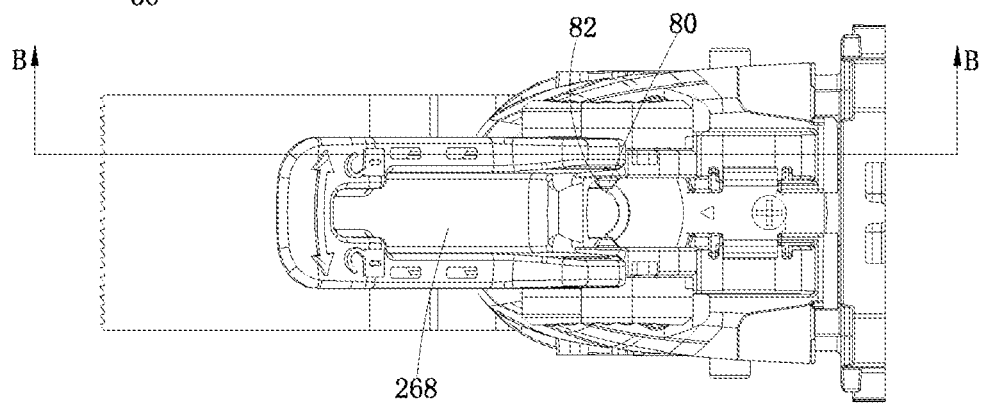
FIG. 15 is a top view of the head housing part of the oscillating power tool shown in FIG. 10, where in this case, a driving member is blocked and cannot mate with the clamping member.

If in the process of moving along the mated direction E, the operating member 268 has not moved to a completely open position, it is founded that the driving member 70 is blocked and cannot mate with the mating portion 82 on the clamping member 58. Referring to FIG. 14 and FIG. 15 for details, the convex stand 80 is located just above the mating portion 82 and is stopped by the mating portion 82, preventing the operating member 268 from further moving along the mated direction E. In this case, in the first implementation, the operating member 68 needs to be rotated, so that the convex stand 80 gives way to the mating portion 82 and is located beside the mating portion 82. However, in the operating process, the operator often fails to notice. Instead, the operator continues to use a portion, stopping the convex stands 80, of the mating portion 82 as a supporting point, to enable the operating member 268 to continue to move along the mated direction E, causing incorrect operation.

Figure 16:
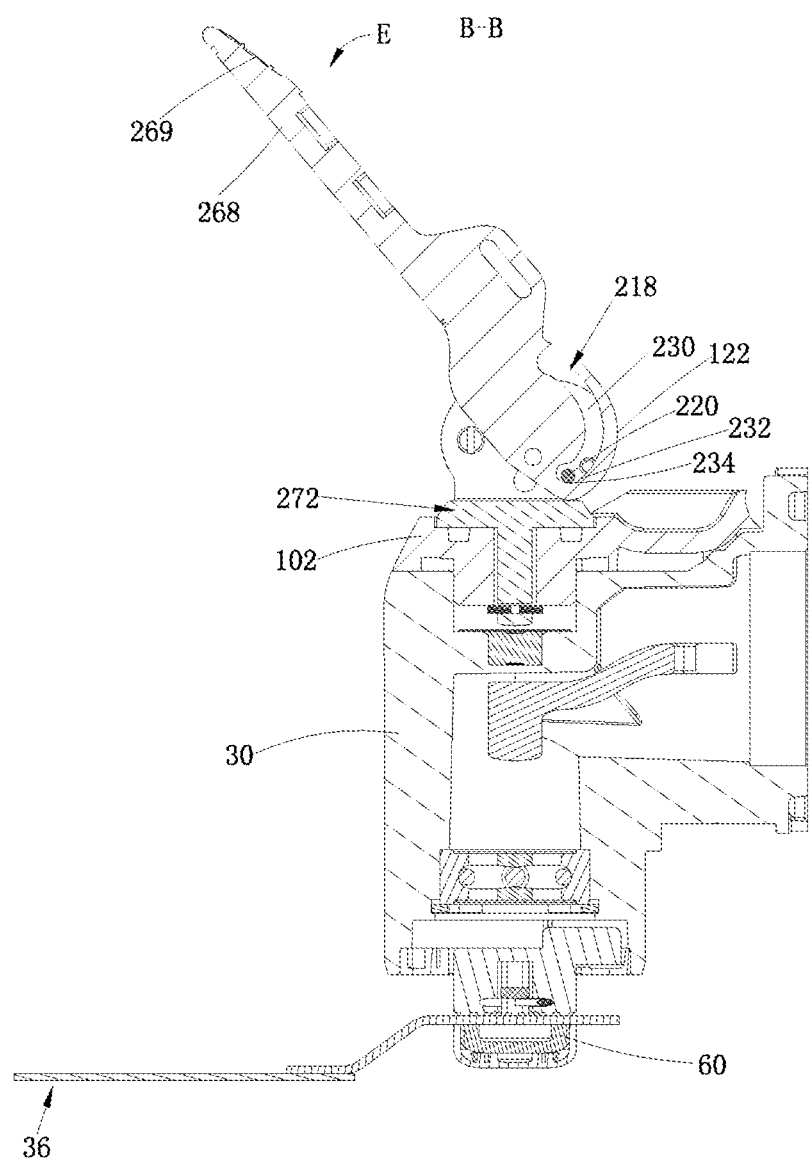
FIG. 16 is a sectional view along a line B-B of FIG. 15.

Therefore, in this implementation, referring to FIG. 16, the stopping groove 218 further includes an intermediate stopping portion 234 disposed on a groove bottom of the stopping groove 218. In the process of moving along the mated direction E by the operating member 268, when the driving member 70 is blocked and cannot mate with the clamping member 58, the stopping pin 220 is stopped by the intermediate stopping portion 234, for preventing the operating member 268 from further moving along the mated direction E. Certainly, the operating portion 269 is prevented from further moving towards the direction close to the working tool 36. In this way, the operator can find in time that in this case, the operating member 268 needs to be rotated, so that the convex stand 80 gives way to the mating portion 82 and is located beside the mating portion 82. Then rotation of the operating member 268 is continued to enable the convex stand 80 to mate with the mating portion 82, so that the operating member 268 can drive the clamping member 58 to rotate relative to the locking member 60, thereby mounting or dismounting the working tool 36.

In this implementation, the intermediate stopping portion 234 and the critical stopping portion 232 are adjacently disposed.

By means of the foregoing descriptions, the oscillating power tools 30 and 200 of the present embodiment quickly drive the clamping member 58 to mate with or disengage from the locking member 60 by using the clamping devices 38 and 238 mounted on the housing 32 without using another aided tool, thereby quickly mounting or dismounting the working tool 36.

In addition, a stopping mechanism is further disposed on the clamping device 38, thereby preventing disengagement that is of the driving member from the clamping unit and caused by further movement of the operating member along the mated direction when the driving member mates with the clamping unit and the operating member drives the clamping unit, so that normal operation can be performed. In addition, the stopping mechanism can also remind in time that in the process of mating towards the clamping member, the driving member is blocked by the mating portion, and therefore cannot drive the clamping member to move, thereby preventing the incorrect operation.

Implementation 3

Figure 17:
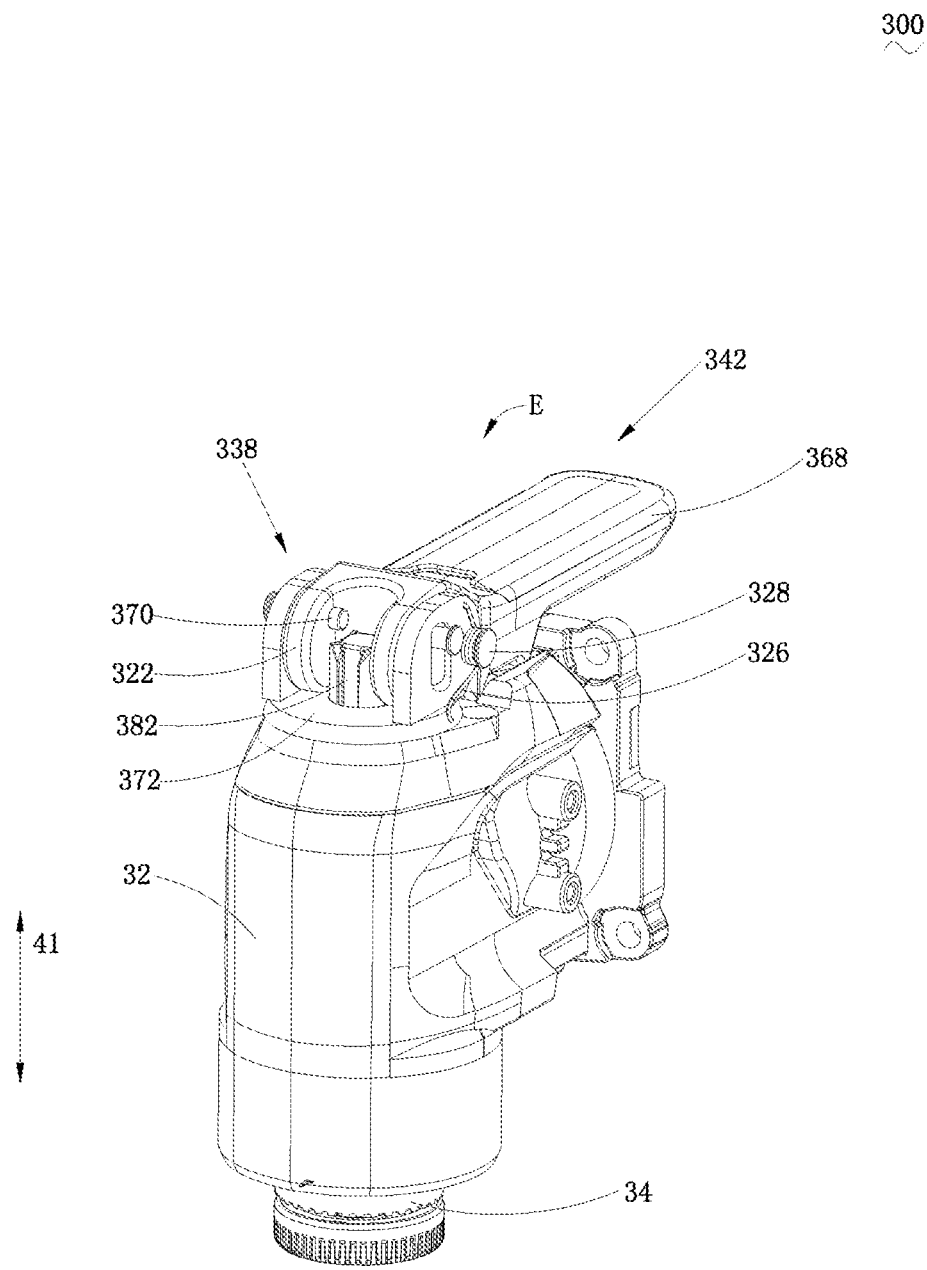
FIG. 17 is a three-dimensional diagram of a head housing part of an oscillating power tool in a third implementation of the present embodiment.
Figure 18:
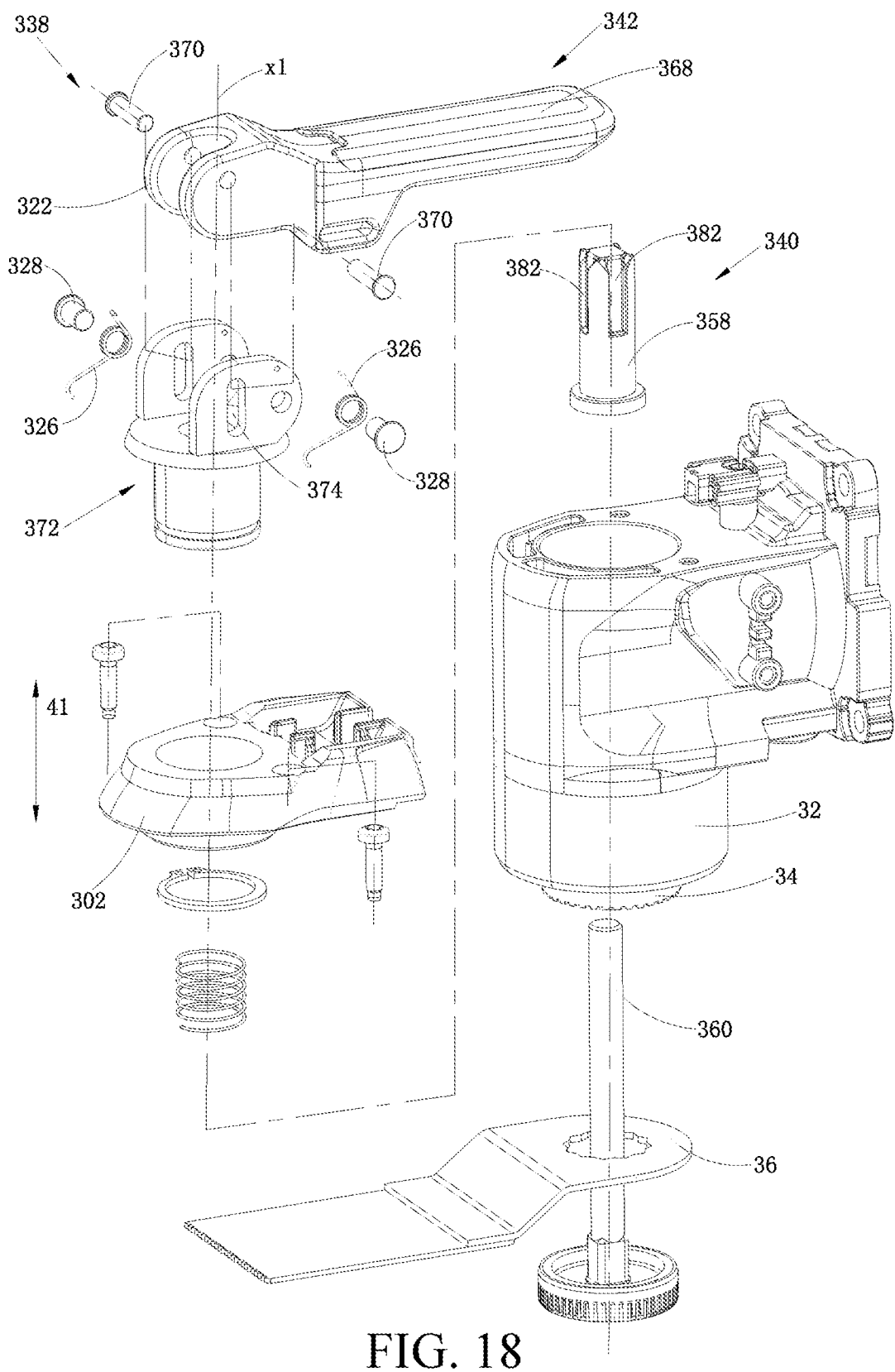
FIG. 18 is a schematic three-dimensional exploded view of the head housing part of the oscillating power tool shown in FIG. 17.

FIG. 17 to FIG. 20 show a third implementation of the present embodiment. Referring to FIG. 17 and FIG. 18, the third implementation provides an oscillating power tool 300, including, basically same as the oscillating power tool 30 in the first implementation, a housing 32, an output shaft 34 that extends out from the inside of the housing 32, a working tool 36 mounted on an end of the output shaft 34, and a clamping device 338 configured to fasten the working tool 36 on the end of the output shaft 34.

In this implementation, referring to FIG. 17 and FIG. 18, the clamping device 338 includes a clamping unit 340 and an operation assembly 342. Basic principles of the clamping unit 340 and the operation assembly 342 are the same as those in the first implementation, but the specific structures thereof are different from those in the first implementation.

The operation assembly 342 includes an operating member 368 and a driving member 370. The operating member 368 is operable to drive the driving member 370 to move between a position where the driving member 370 mates with the clamping unit 340 and a position where the driving member 370 disengages from the clamping unit 340. The driving member 370 mates with the clamping unit 340. The operating member 368 is connected to the clamping unit 340 without relative rotation. In this case, the operation assembly 342 is in the mated mode, and the operating member 368 rotates and is capable of driving the clamping unit 340 to clamp or release the working tool 36; the driving member 370 disengages from the clamping unit 340, and the operating member 368 is rotatable relative to the clamping unit 340. In this case, the operation assembly 342 is in the disengaged mode. Herein, a direction towards which the driving member 370 mates with the clamping unit 340 is defined as a mated direction (represented by an arrow E in FIG. 17), and a direction opposite thereto is a defined as a disengaged direction.

The operating member 368 is provided with a circular hole. In this implementation, the driving member 370 is a round pin. The driving member 370 is in interference fit with the round hole, thereby relatively fixedly fastening the driving member 370 on the operating member 368, so that the operating member 368 is capable of driving the driving member 370 to move together.

The clamping device 338 includes an attachment seat 372 rotatably disposed on the housing 32 around the axis parallel to the axial direction 41. The operating member 368 is movably mounted on the attachment seat 372, so that the operating member 368 can rotate around the axis X1 together with the attachment seat 372.

The attachment seat 372 is provided with a guiding groove 374, and the operating member 368 is provided with a guiding member. Herein, the guiding member is fixedly connected to the driving member 370. Further, the guiding member and the driving member 370 may be integrally formed. During mounting, the guiding member (the driving member 370) runs through the guiding groove 374 to mate with the circular hole on the operating member 368.

In this implementation, the guiding groove 374 is a strait-line groove, and has a guiding surface that longitudinally extends, and the driving member 370 rotates and slides along the guiding surface. In this way, the operating member 368 can be inversely disposed on the attachment seat 372 around a movable rotating axis, so that the driving member 370 mates with and disengages from the clamping unit 340. Herein, the operating member 368 is inversely disposed and rotates around the movable rotating axis. There is no fixed axis of rotation. The movable rotating axis is perpendicular to the axis X1 of the output shaft 34, that is, perpendicular to the axial direction. Preferably, the movable rotating axis is perpendicular to the central plane. The movable rotating axis linearly moves in a plane perpendicular to the movable rotating axis. In this embodiment, the trace of the linear movement is a straight line. Therefore, the operating member 368 not only rotates, but also linearly moves, and performs compound motion relative to the attachment seat 372. In this way, not only comfort of operation can be achieved, but also parts can be saved, thereby making the structure simpler and more reliable.

To make the operation more smooth, the operating member 368 is provided with a cam surface 322 mating with the attachment seat 372. The cam surface 322 abuts against an upper surface of the attachment seat 372, and the driving member 370 rotates and slides in the guiding groove 374, so that the operating member 368 can smoothly invert relative to the housing 32, thereby implementing a switchover of the operation assembly 342 between the mated mode and the disengaged mode.

An elastic member 326 is disposed between the attachment seat 372 and the operating member 368, and the elastic member 326 provides a spring force to push the operating member 368 to be located at the open position. In this way, it is convenient for the operator to invert the operating member 368 to the open position. Specifically, a positioning pin 328 is disposed on the attachment seat 372, the elastic member 326 is sleeved on the positioning pin 328, one end of the elastic member 326 runs through a hole on the attachment seat 372 to be clamped on the operating member 368, and the other end of the elastic member 326 is clamped on the attachment seat 372.

The clamping unit 340 includes a clamping member 358 capable of pivoting around an axis parallel to the axial direction 41 and a locking member 360 that threadedly mates with the clamping member 358. The clamping member 358 is provided with a mating portion 382 mating with the driving member 370. Different from the first implementation, in this implementation, the mating portion 382 is four mating grooves disposed in a circumferential direction of the clamping member 358. Certainly, the number of the mating grooves may be N, and is not limited to four in this implementation, and the mating grooves need only to receive insertion of the driving member 370.

For the specific operation, referring to FIG. 17, the operation assembly 342 is located at the initial position. The operating member 368 is attached to the top of the housing 32. In this case, the operating member 368 may be clamped on the housing 32 by using a clamping structure (not numbered). When the operating member 368 is located at the initial position, although the mating portion 382 on the clamping member 358 protrudes from an upper surface of the attachment seat 372, the mating portion 382 is dislocated, in the axial direction 41, from the driving member 370. They disengage from each other, and the operation assembly 342 is in the disengaged mode.

Figure 19:
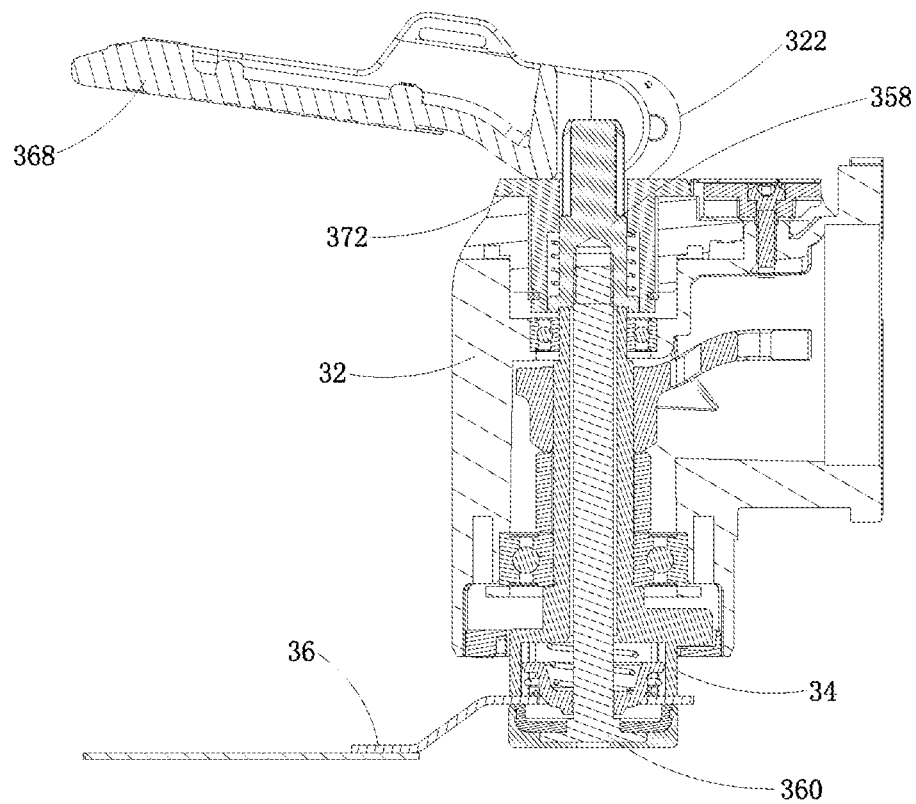
FIG. 19 is a sectional view of the head housing part of the oscillating power tool shown in FIG. 17, where in this case, an operating member is located at an open position.
Figure 20:
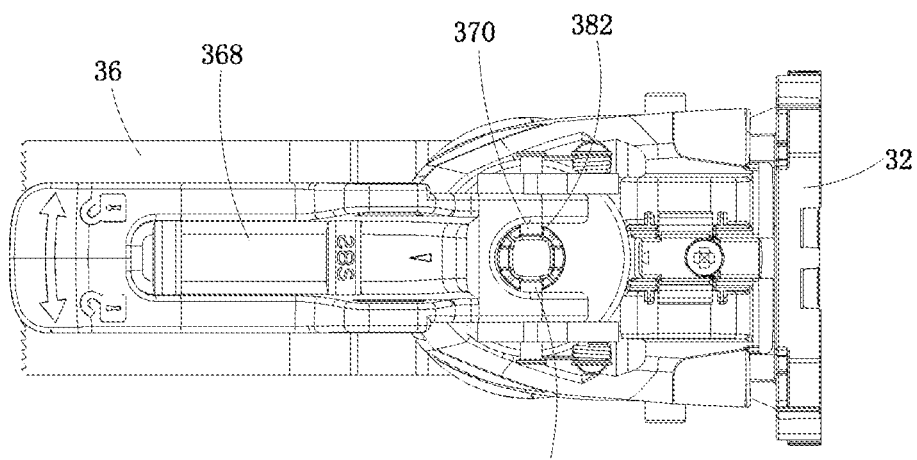
FIG. 20 is a top view of the head housing part of the oscillating power tool shown in FIG. 17, where in this case, the operating member is located at an open position, and a driving member mates with a clamping member.

A force is applied to the operating member 368, and the operation assembly 342 abuts against the upper surface 96 of the attachment seat 372 by using the cam surface 322. That is, the operating member 368 drives the driving member 370 to move along the mated direction E. In addition, the driving member 370 rotates and slides in the guiding groove 374, so that the operating member 368 inverts to the open position, as shown in FIG. 19 and FIG. 20. In this case, the driving member 370 moves downwards in the axial direction 41 relative to the initial position, so that the driving member 370 at least partially overlaps, in the axial direction 41, with the mating portion 382 on the clamping member 358. In this way, the driving member 370 is inserted in the mating portion 382 and is capable of driving the clamping member 358 to rotate together, so that the clamping member 358 and the locking member 360 are threadedly clamped or released, thereby mounting or replacing the working tool 36. Apparently, after the working tool 36 is mounted or replaced, then the operation assembly 342 is wrenched back from the open position to the initial position, and the driving member 370 moves upwards in the axial direction 41 relative to the open position, so that the driving member 370 disengages from the mating portion 382.

Implementation 4

Figure 23:
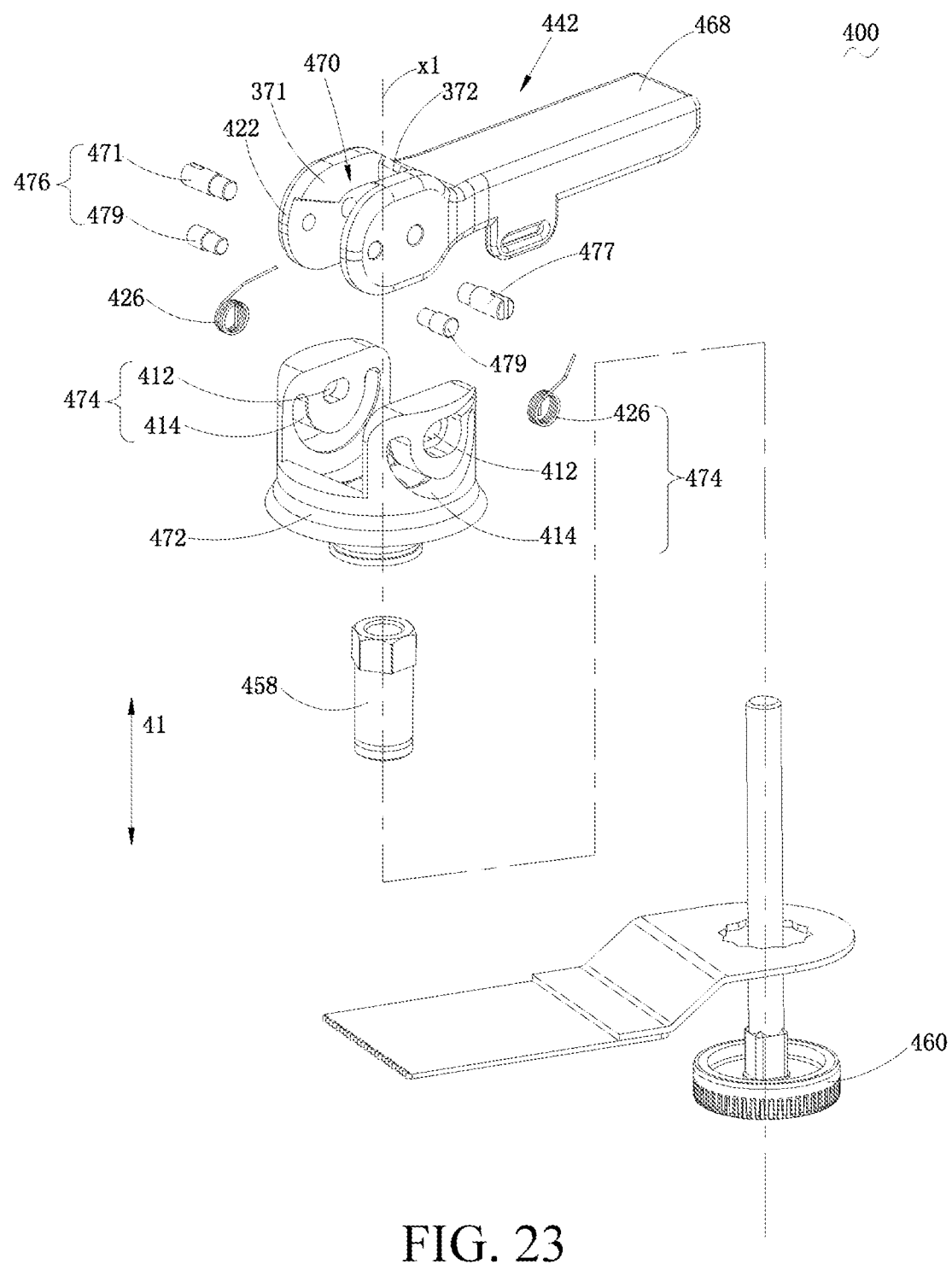
FIG. 23 is a schematic three-dimensional exploded view of some of members in the oscillating power tool shown in FIG. 21.

FIG. 21 to FIG. 23 show a fourth implementation of the present embodiment. Referring to FIG. 21 for details, the fourth implementation provides an oscillating power tool 400, including, basically same as the oscillating power tool 30 in the first implementation, a housing 32, an output shaft 34 that extends out from the inside of the housing 32, a working tool (not shown) mounted on an end of the output shaft 34, and a clamping device 438 configured to fasten the working tool on the end of the output shaft 34.

In this implementation, the clamping device 438 includes a clamping unit 440 and an operation assembly 442. Basic principles of the clamping unit 440 and the operation assembly 442 are the same as those in the first implementation, but specific structures thereof are different from those in the first implementation.

The operation assembly 442 includes an operating member 468 and a driving member 470. The operating member 468 is operable to drive the driving member 470 to move between a position where the driving member 470 mates with the clamping unit 440 and a position where the driving member 470 disengages from the clamping unit 440. The driving member 470 mates with the clamping unit 440. The operating member 468 is connected to the clamping unit 440 without relative rotation. In this case, the operation assembly 442 is in the mated mode, and the operating member 468 rotates and is capable of driving the clamping unit 440 to clamp or release the working tool; the driving member 470 disengages from the clamping unit 440, and the operating member 468 is rotatable relative to the clamping unit 440. In this case, the operation assembly 442 is in the disengaged mode.

In this implementation, the driving member 470 is fixedly disposed on the operating member 468. The operating member 468 is provided with a groove 478, and the driving member 470 is disposed on an inner wall of the groove 478. Herein, the driving member 470 includes a first actuating surface 471 and a second actuating surface 473 that are disposed on the inner wall of the groove 478. The first actuating surface 471 and the second actuating surface 473 are parallel to an extension direction of the operating member 468.

As shown in FIG. 21, the first actuating surface 471 and the second actuating surface 473 are dislocated, in the axial direction 41, from the clamping unit 440. They disengage from each other. In this case, the operation assembly 442 is in the disengaged mode, and the operating member 468 cannot drive the clamping unit 440 to rotate. After the operating member 468 inverts, as shown in FIG. 22, the first actuating surface 471 and the second actuating surface 473 mate with the clamping unit 440, and the operation assembly 442 is in the mated mode.

Referring to FIG. 23, the clamping device 438 includes an attachment seat 472 rotatably disposed on the housing 32 around the axis parallel to the axial direction 41. The operating member 468 is movably mounted on the attachment seat 472, so that the operating member 468 can rotate around the axis X1 together with the attachment seat 472.

The attachment seat 472 is provided with a guiding groove 474, and the operating member 468 is provided with a guiding member 476. In this implementation, the guiding groove 474 includes a first guiding groove 412 and a second guiding groove 414 that are separately disposed. The first guiding groove 412 and the second guiding groove 414 do not communicate with each other. At least one of the first guiding groove 412 or the second guiding groove 414 may be an arcuate groove. However, in this embodiment, the first guiding groove 412 is a waist-shaped groove, and the second guiding groove 414 is an arcuate groove. Preferably, the second guiding groove 414 is a semicircular groove.

The guiding member 476 includes a first guiding member 477 received in the first guiding groove 412, and a second guiding member 479 received in the second guiding groove 414. During mounting, the first guiding member 477 runs through the first guiding groove 412 to be connected to the operating member 468, and the second guiding member 479 runs through the second guiding groove 414 to be connected to the operating member 468. The first guiding groove 412 and the second guiding groove 414 each have a guiding surface that longitudinally extends. In this way, the first guiding member 477 is rotatable and sliding in the first guiding groove 412, and the second guiding member 479 is rotatable and sliding in the second guiding groove 414, so that the operating member 468 can be inversely disposed on the attachment seat 472 around a movable rotating axis, so that the driving member 470 mates with and disengages from the clamping unit 440. The movable rotating axis is perpendicular to the axis X1 of the output shaft 34, that is, perpendicular to the axial direction. Preferably, the movable rotating axis is perpendicular to the central plane. The movable rotating axis linearly moves in a plane perpendicular to the movable rotating axis. In this embodiment, the trace of the linear movement is a curved line. Therefore, the operating member 468 not only rotates, but also linearly moves, and performs compound motion relative to the attachment seat 472. In this way, not only comfort of operation can be achieved, but also parts can be saved, thereby making the structure simpler and more reliable.

To make the operation more smooth, the operating member 468 is provided with a cam surface 422 mating with the attachment seat 472. The cam surface 422 abuts against an upper surface of the attachment seat 472, the first guiding member 477 rotates and slides in the first guiding groove 412, and the second guiding member 479 rotates and slides in the second guiding groove 414, so that the operating member 468 can smoothly invert relative to the housing 32, thereby implementing a switchover of the operation assembly 442 between the mated mode and the disengaged mode.

An elastic member 426 is disposed between the attachment seat 472 and the operating member 468, and the elastic member 426 provides a spring force to push the operating member 468 to be located at the open position. In this way, it is convenient for the operator to invert the operating member 468 to the open position. In this implementation, the elastic member 426 is sleeved on the first guiding member 477, one end of the elastic member 426 is clamped on the attachment seat 472, and the other end of the elastic member 426 is clamped on the first guiding member 477.

The clamping unit 440 includes a clamping member 458 capable of pivoting around an axis parallel to the axial direction 41 and a locking member 460 that threadedly mates with the clamping member 458. The clamping member 458 is provided with a mating portion 482 mating with the driving member 470. Different from the first implementation, the mating portion 482 includes plurality of mating surfaces that are symmetrically disposed in a circumferential direction of the clamping member 458. Preferably, the number of the mating surfaces that mate with the driving member 470 is even, and a distance between two opposite mating surfaces directly facing each other is equal to a distance between the first actuating surface 471 and the second actuating surface 473. Projections of the plurality of mating surfaces in a plane perpendicular to the axial direction 41 form a regular polygon with an even number of edges. Preferably, the number of the mating surfaces is six, eight, or the like. In this way, the first actuating surface 471 and the second actuating surface 473 may be clamped to the two opposite mating surfaces directly facing each other, and drive the clamping member 458 to rotate around the axis X1 together. In this implementation, the number of the mating surfaces is six. That is, the clamping member 458 is a lengthened hexagonal nut, and is in threaded connection to the locking member 460 (bolt).

Referring to FIG. 21 for the specific operation, the operation assembly 442 is located at the initial position. The operating member 468 is attached to the top of the housing 32. In this case, the operating member 468 may be clamped on the housing 32 by using a clamping structure (not numbered). When the operating member 468 is located at the initial position, although the mating portion 482 on the clamping member 458 protrudes from an upper surface of the attachment seat 472, the mating portion 482 is dislocated, in the axial direction 41, from the driving member 470. They disengage from each other, and the operation assembly 442 is in the disengaged mode.

A force is applied to the operating member 468, and the operation assembly 442 abuts against the upper surface 96 of the attachment seat 472 by using the cam surface 422. That is, the operating member 468 drives the driving member 470 to move. In addition, the first guiding member 477 rotates and slides in the first guiding groove 412, and the second guiding member 479 rotates and slides in the second guiding groove 414, so that the operating member 468 inverts to the open position, as shown in FIG. 22. In this case, the driving member 470 moves downwards in the axial direction 41 relative to the initial position, so that the driving member 470 at least partially overlaps, in the axial direction 41, with the mating portion 482 on the clamping member 458. Therefore, the first actuating surface 471 and the second actuating surface 473 are clamped to the two opposite mating surfaces, directly facing each other, of the mating portion 482, and can drive the clamping member 458 to rotate together, so that the clamping member 458 and the locking member 460 are threadedly clamped or released, thereby mounting or replacing the working tool. Apparently, after the working tool is mounted or replaced, then the operation assembly 442 is wrenched back from the open position to the initial position, and the driving member 470 moves upwards in the axial direction 41 relative to the open position, so that the driving member 470 disengages from the mating portion 482.

In this embodiment, the first actuating surface 471 and the second actuating surface 473 may be symmetrically disposed. However, preferably, the first actuating surface 471 and the second actuating surface 473 are not completely symmetrically disposed, and the extension length of at least one actuating surface is greater than that of the other actuating surface. By means of such a setting, in the inversion process of the operating member 468, the actuating surface with a relatively long extension length (the first actuating surface 471 in the implementation) first comes into contact with a mating surface of the mating portion 482, With inversion of the operating member 468, the position of the clamping member 458 can be adjusted, facilitating the actuating surface with a relatively short extension length (the second actuating surface 473 in the implementation) to better come into contact with a directly facing mating surface without rotating the operating member 468, and this is quite convenient.

Implementation 5

Figure 26:
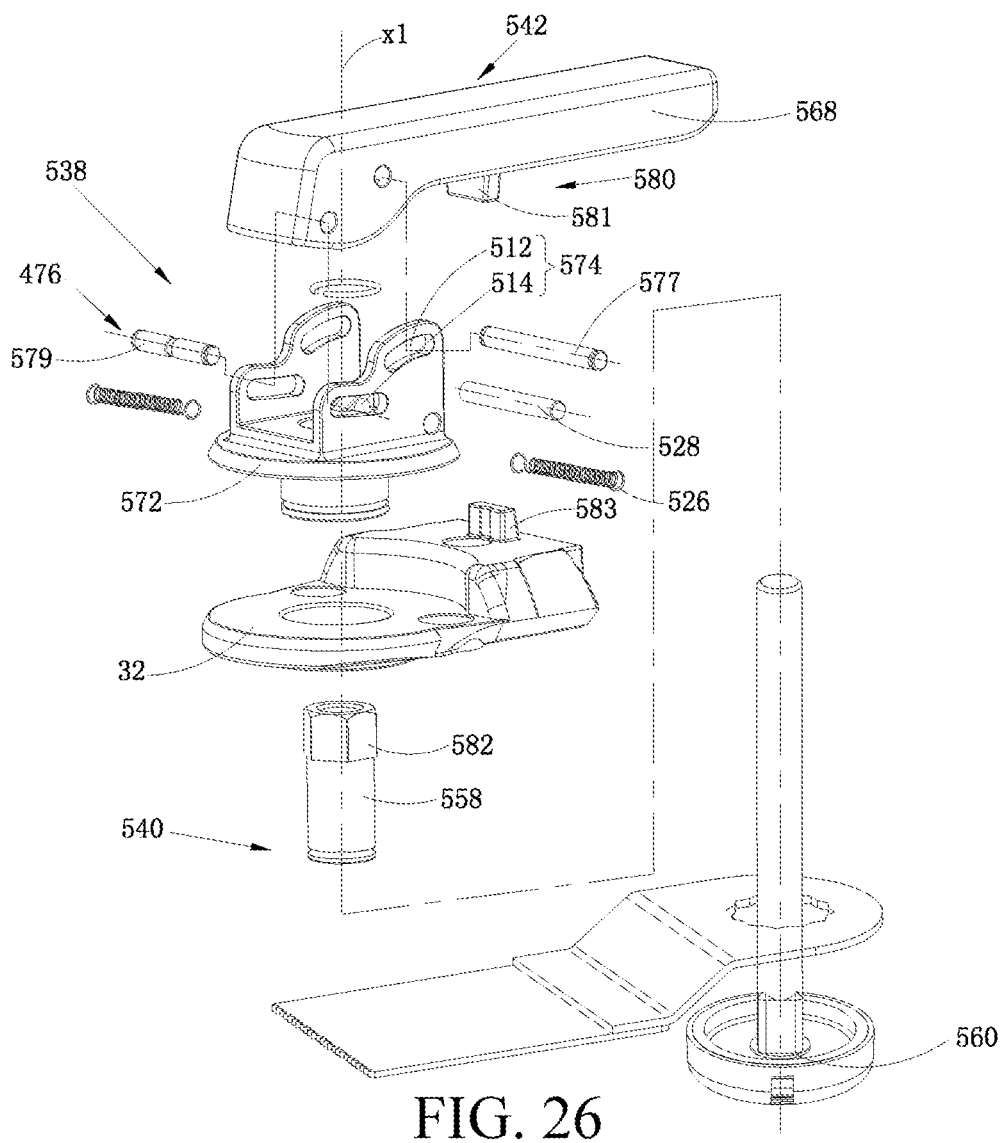
FIG. 26 is a schematic three-dimensional exploded view of some of members in the oscillating power tool shown in FIG. 24.

FIG. 24 to FIG. 27 show a fifth implementation of the present embodiment. Referring to FIG. 24 for details, the fifth implementation provides an oscillating power tool 500, including, basically same as the oscillating power tool 30 in the first implementation, a housing 32, an output shaft 34 that extends out from the inside of the housing 32, a working tool (not shown) mounted on an end of the output shaft 34, and a clamping device 538 configured to fasten the working tool on the end of the output shaft 34. Referring to FIG. 24 and FIG. 26, the clamping device 538 includes a clamping unit 540 and an operation assembly 542. The structure of the clamping unit 540 is basically the same as that in the first implementation, but the mounting manner and the operating method of the operation assembly 542 are different from those in the first implementation.

Figure 27:
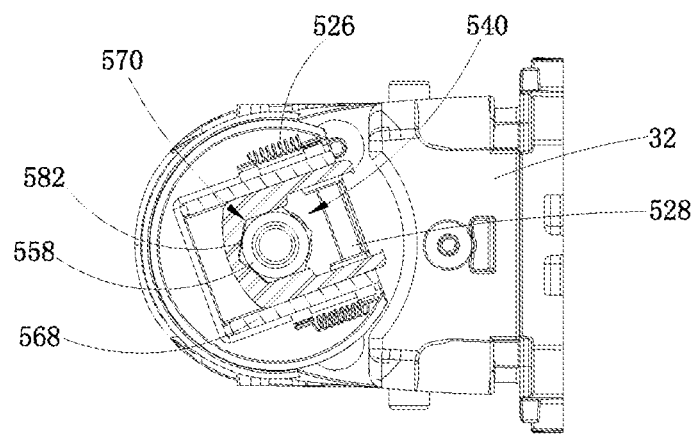
FIG. 27 is a sectional view of the head housing part of the oscillating power tool shown in FIG. 24.

The operation assembly 542 includes an operating member 568 and a driving member 570 (referring to FIG. 27). The operating member 568 is operable to drive the driving member 570 to move between a position where the driving member 570 mates with the clamping unit 540 and a position where the driving member 70 disengages from the clamping unit 540. The driving member 570 mates with the clamping unit 540. The operating member 568 is connected to the clamping unit 540 without relative rotation. In this case, the operation assembly 542 is in the mated mode, and the operating member 568 rotates and is capable of driving the clamping unit 540 to clamp or release the working tool; the driving member 570 disengages from the clamping unit 540, and the operating member 568 is rotatable relative to the clamping unit 540. In this case, the operation assembly 542 is in the disengaged mode.

The clamping device 538 includes an attachment seat 572 rotatably disposed on the housing 32 around the axis parallel to the axial direction 41. The operating member 568 is movably mounted on the attachment seat 572, so that the operating member 568 can rotate around the axis X1 together with the attachment seat 572.

The attachment seat 572 is provided with a guiding groove 574, and the operating member 568 is provided with a guiding member 576. In this implementation, the guiding groove 574 includes a first guiding groove 512 and a second guiding groove 514 that are separately disposed. The first guiding groove 512 and the second guiding groove 514 do not communicate with each other, and at least one of the first guiding groove 512 or the second guiding groove 514 may be an arcuate groove. However, in this embodiment, the first guiding groove 512 is an arcuate groove, and the second guiding groove 514 is a straight groove. Preferably, an extension direction of the second guiding groove 514 is approximately perpendicular to the axis X1. More preferably, an angle between two extension directions of the first guiding groove 512 and the second guiding groove 514 is an acute angle.

The guiding member 576 includes a first guiding member 577 received in the first guiding groove 512, and a second guiding member 579 received in the second guiding groove 514. During mounting, the first guiding member 577 runs through the first guiding groove 512 to be connected to the operating member 568, and the second guiding member 579 runs through the second guiding groove 514 to be connected to the operating member 568. The first guiding groove 512 and the second guiding groove 514 each have a guiding surface that longitudinally extends. In this way, the first guiding member 577 is rotatable and sliding in the first guiding groove 512, and the second guiding member 579 is rotatable and sliding in the second guiding groove 514. In this way, the operating member 568 is rotatable around the movable rotating axis. Herein, the movable rotating axis is perpendicular to the axis X1 of the output shaft 34, that is, perpendicular to the axial direction. Preferably, the movable rotating axis is perpendicular to the central plane. The movable rotating axis linearly moves in a plane perpendicular to the movable rotating axis. In this embodiment, the trace of the linear movement is an arc line. Therefore, the operating member 568 not only rotates, but also linearly moves, and performs compound motion relative to the attachment seat 572. However, in this implementation, the driving member 570 does not mate with or disengage from the clamping unit 540 by means of inversion motion of the operating member 568. Instead, the driving member 570 can mate with or disengage from the clamping unit 540 only by means of inclination by a particular angle (refer to FIG. 24 and FIG. 25).

A holding mechanism 580 is disposed between the operating member 568 and the housing 32. The holding mechanism 580 includes a first holding member 581 disposed on the operating member 568 and a second holding member 583 disposed on the housing 32. The first holding member 581 and the second holding member 583 mate with each other, so that the operating member 568 can be kept at the initial position relative to the housing 32. During specific operation, the operating member 568 needs only to be lifted, thereby driving the driving member 570 to mate with the clamping unit 540.

An elastic member 526 is disposed between the attachment seat 572 and the operating member 568, and the elastic member 526 provides a spring force to push the operating member 568 to drive the driving member 570 to move towards a position where the driving member 570 mates with the clamping unit 540. In this way, when the working tool needs to be replaced, the operator needs to only lift the operating member 568, so that the first holding member 581 disengages from the second holding member 583, and the operating member 568 can automatically moves, under an effect of the elastic member, towards the position where the operating member 568 mates with the clamping unit 540. Specifically, a positioning pin 528 is disposed on the attachment seat 572, one end of the elastic member 526 is clamped on the positioning pin 528, and the other end of the elastic member 526 is clamped on the second guiding member 579.

In this implementation, the structure of the clamping unit 540 is basically the same as that in the first implementation, including a clamping member 558 capable of pivoting around an axis parallel to the axial direction 41 and a locking member 560 that threadedly mates with the clamping member 558. The clamping member 558 is provided with a mating portion 582 mating with the driving member 570. The mating portion 582 includes plurality of mating surfaces that are symmetrically disposed in a circumferential direction of the clamping member 558. Preferably, the number of the mating surfaces that mate with the driving member 570 is even. Projections of the plurality of mating surfaces in a plane perpendicular to the axial direction 41 form a regular polygon with an even number of edges. Preferably, the number of the mating surfaces is six, eight, or the like. In this implementation, the number of the mating surfaces is six. That is, the clamping member 558 is a lengthened hexagonal nut, and is in threaded connection to the locking member 560 (bolt).

In this implementation, the specific structure of the driving member 570 is different from that in the first implementation. Referring to FIG. 27 for details, the operating member 568 is provided with an inner cavity, and the driving member 570 is fixedly disposed in the inner cavity of the operating member 568. The driving member 570 includes plurality of actuating surfaces disposed in the inner cavity of the operating member 568. A distance between two actuating surfaces directly facing each other is equal to a distance between two opposite mating surfaces directly facing each other. In this way, the driving member 570 is capable of driving the clamping member 458 to rotate around the axis X1 together. Preferably, the number of the mating surfaces is even. Preferably, the number of the mating surfaces is two, four, or the like. In this implementation, the number of the mating surfaces is two.

Referring to FIG. 24 for the specific operation, the operation assembly 542 is located at the initial position. The operating member 568 is attached to the top of the housing 32. In this case, the holding mechanism 580 keeps the operating member 568 at the initial position relative to the housing 32. When the operating member 568 is located at the initial position, although the mating portion 582 on the clamping member 558 protrudes from an upper surface of the attachment seat 572, the mating portion 582 is dislocated, in the axial direction 41, from the driving member 570. They disengage from each other, and the operation assembly 542 is in the disengaged mode.

The operating member 568 is lifted, so that the first holding member 581 disengages from the second holding member 583, and the operating member 568 can automatically moves, under an effect of the elastic member, towards the position where the operating member 568 mates with the clamping unit 540. In addition, the first guiding member 577 rotates and slides in the first guiding groove 512, and the second guiding member 579 rotates and slides in the second guiding groove 514, so that the operating member 468 moves to a mated position, as shown in FIG. 25 and FIG. 27. In this case, two actuating surfaces, directly facing each other, of the driving member 570 are clamped to two opposite mating surfaces, directly facing each other, of the mating portion 482, and can drive the clamping member 558 to rotate together, so that the clamping member 558 and the locking member 560 are threadedly clamped or released, thereby mounting or replacing the working tool. Apparently, after the working tool is mounted or replaced, then the operating member 568 is pushed, the elastic member 526 is compressed, and the first holding member 581 is enabled to mate with the second holding member 583, so that the operating member 568 is wrenched back and kept at the initial position.

Although the inventor has made descriptions and given examples to the technical solutions of the present embodiment in detail, it should be understood that, for persons skilled in the art, it is apparent to make modifications and/or changes or use equivalent alternative solutions for the foregoing implementations, without departing from the essence of the spirit of the present embodiment. The terms in the present embodiment are used for descriptions and understanding for the technical solutions of the present embodiment, and cannot constitute a limitation to the present embodiment.

What is claimed is:

1. A clamping device of a hand-held tool, wherein the clamping device comprises:
   a mounting base;
   a clamping unit being configured to fasten a working tool in an axial direction and comprising a clamping member capable of pivoting around an axis parallel to the axial direction and a locking member capable of mating with the clamping member; and
   an operation assembly, comprising an operating member for use by an operator and a driving member, wherein the operating member is capable of performing a compound motion relative to the mounting base, and the operating member is manually operated and directly touched by the user to drive the driving member to selectively mate with and disengage from the clamping member;
   wherein one of the operating member and the mounting base is provided with a guiding member, the other one of the operating member and the mounting base is provided with a guiding groove, and the guiding member is rotatable and sliding in the guiding groove thereby leading the operating member to perform the compound motion relative to the mounting base between an initial position wherein the driving member is disengaged from the clamping member and an open position wherein the driving member selectively mates with the clamping member, when the driving member is mated with the clamping member, the operating member is capable of driving the clamping member to rotate around the axis to clamp with or release the locking member.

2. The clamping device according to claim 1, wherein the compound motion comprises a rotational motion around a movable rotating axis.

3. The clamping device according to claim 2, wherein the movable rotating axis is linearly movable in a plane perpendicular to the movable rotating axis.

4. The clamping device according to claim 3, wherein a trace of the movable rotating axis comprises a straight line, a curved line, a polyline, an arc line, or a combination of at least two of a straight line, a curved line, a polyline, and an arc line.

5. The clamping device according to claim 1, wherein the guiding member is a pin.

6. The clamping device according to claim 1, wherein the guiding groove comprises a first groove and a second groove that communicate with each other, and an angle formed between the first groove and the second groove is an obtuse angle.

7. The clamping device according to claim 6, wherein at least one of the first groove and the second groove is obliquely disposed relative to the axial direction.

8. The clamping device according to claim 1, wherein the guiding groove comprises a straight-line groove, and the straight-line groove is disposed along the axial direction or obliquely disposed relative to the axial direction.

9. The clamping device according to claim 1, wherein the guiding groove comprises a first guiding groove and a second guiding groove that are separately disposed, and the guiding member comprises a first guiding member received in the first guiding groove and a second guiding member received in the second guiding groove.

10. The clamping device according to claim 9, wherein at least one of the first guiding groove and the second guiding groove is an arcuate groove.

11. The clamping device according to claim 1, wherein the guiding member is disposed on the operating member, and the guiding member is fixedly connected to the driving member.

12. The clamping device according to claim 1, wherein the driving member is fixedly disposed on the operating member.

13. The clamping device according to claim 1, wherein the clamping member comprises a mating portion that is selectively mateable with the driving member.

14. The clamping device according to claim 13, wherein the driving member comprises a convex stand being disposed on the operating member, and the mating portion comprises a mating surface that is selectively mateable with the convex stand.

15. The clamping device according to claim 13, wherein the driving member is a round pin, and the mating portion is a mating groove mating with the round pin.

16. The clamping device according to claim 13, wherein the driving member comprises a first actuating surface and a second actuating surface that are disposed on the operating member, the mating portion comprises plurality of mating surfaces that are symmetrically disposed, and the first actuating surface and the second actuating surface are selectively clamped on two opposite mating surfaces.

17. The clamping device according to claim 1, wherein the guiding groove includes opposing closed ends, wherein the guiding groove guides the guiding member between the closed ends when the operating member travels between the initial position and the open position.

18. The claimping device according to claim 1, further comprising a stopping groove and a stopping member, wherein one of the operating member and the mounting base is provided with the stopping groove, the other one of the operating member and the mounting base is provided with the stopping member.

19. A hand-held tool, comprising a housing, a motor received in the housing, a spindle driven by the motor to perform a rotary motion, an output shaft being configured to mount a working tool, and an eccentric oscillating mechanism disposed between the spindle and the output shaft, and the eccentric oscillating mechanism is configured to convert the rotary motion of the spindle into an oscillation of the output shaft, and the hand-held tool further comprising a clamping device according to claim 1.

* * * * *